(12) United States Patent
Grund et al.

(10) Patent No.: US 7,416,591 B2
(45) Date of Patent: Aug. 26, 2008

(54) DISPERSE DYE MIXTURES

(75) Inventors: Clemens Grund, Hattersheim (DE); David Brierley, Oldham (GB); Alan T. Leaver, Manchester (GB)

(73) Assignee: DyStar Textilfarben GmbH & Co. Deutschland KG, Frankfurt am Main (DE)

( * ) Notice: Subject to any disclaimer, the term of this patent is extended or adjusted under 35 U.S.C. 154(b) by 0 days.

(21) Appl. No.: 11/576,933

(22) PCT Filed: Oct. 5, 2005

(86) PCT No.: PCT/EP2005/055028

§ 371 (c)(1),
(2), (4) Date: Jun. 26, 2007

(87) PCT Pub. No.: WO2006/037792

PCT Pub. Date: Apr. 13, 2006

(65) Prior Publication Data

US 2008/0022894 A1    Jan. 31, 2008

(30) Foreign Application Priority Data

Oct. 8, 2004    (GB) ................... 0422403.6

(51) Int. Cl.
*C09D 11/02*    (2006.01)
*C09B 67/00*    (2006.01)
(52) U.S. Cl. .............. 106/31.43; 106/31.44; 106/31.46; 106/31.47; 106/31.48; 106/31.49; 106/31.5; 8/638
(58) Field of Classification Search .............. 106/31.43, 106/31.46, 31.47, 31.48, 31.49, 31.44, 31.5; 8/638
See application file for complete search history.

(56) References Cited

U.S. PATENT DOCUMENTS

| | | | | |
|---|---|---|---|---|
| 4,872,882 A | * | 10/1989 | Hahnke et al. ............ | 8/638 |
| 5,529,586 A | * | 6/1996 | Fukui et al. .............. | 8/639 |
| 5,547,478 A | * | 8/1996 | Fukui et al. .............. | 8/643 |
| 5,779,778 A | * | 7/1998 | Gregory et al. .......... | 106/31.27 |
| 5,928,388 A | * | 7/1999 | Leaver .................... | 8/638 |
| 7,118,604 B2 | * | 10/2006 | Brierley et al. ........... | 8/643 |
| 2007/0220688 A1 | * | 9/2007 | Han et al. ................ | 8/506 |

FOREIGN PATENT DOCUMENTS

| | | |
|---|---|---|
| DE | 19848201 A1 | 4/2000 |
| EP | 363034 A2 | 4/1990 |
| EP | 0450765 A1 | 10/1991 |
| EP | 0492893 A2 | 7/1992 |
| EP | 0603803 A1 | 6/1994 |
| JP | 7062260 | 3/1995 |
| WO | WO-97/04031 A1 | 2/1997 |
| WO | WO-2005/028409 A1 | 3/2005 |
| WO | WO-2005/054375 A1 | 6/2005 |

* cited by examiner

*Primary Examiner*—Helene Klemanski
(74) *Attorney, Agent, or Firm*—Connolly Bove Lodge & Hutz LLP

(57) ABSTRACT

Dye mixtures comprising one or more dyes of the herein below indicated and defined formula (I), and at least one of the herein below indicated and defined general dye of: formula (II), or one or more dyes of formula (III) or one or more dyes of formula (IV), or one or more dyes of formula (V), or one or more dyes of formula (VI), wherein $R^1$ to $R^{21}$, P, Q, X, Y and Z are as defined in claim 1, method for the preparation of the dye mixture and a process for coloring a synthetic textile material or fiber blend thereof.

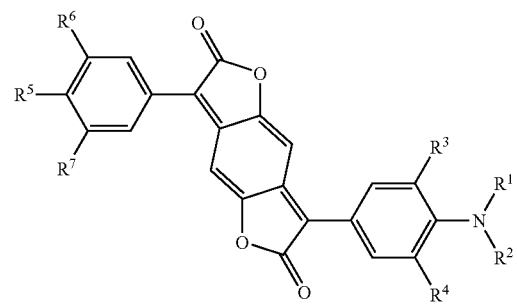

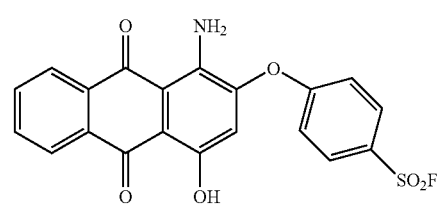

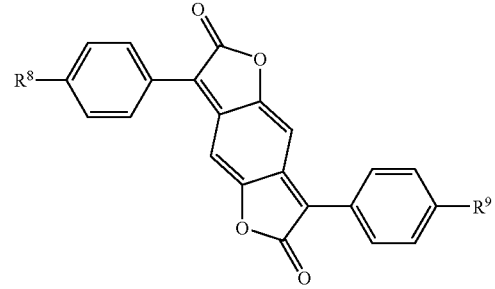

17 Claims, No Drawings

DISPERSE DYE MIXTURES

RELATED APPLICATIONS

This application is a national stage application (under 35 U.S.C. 371) of PCT/EP2005/055028 filed Oct. 5, 2005, which claims benefit of United Kingdom application 0422403.6 filed Oct. 8, 2004.

This invention relates to mixtures of dull blue to navy disperse dyes, particularly a mixture of disperse polycyclic dyes with other disperse azo, anthraquinone or benzodifuranone dyes to achieve deep black shades and to a process for the coloration of synthetic textile materials and to textile materials when coloured with the mixture of dyes.

Mixed disperse dyes and their use for dyeing polyester and its blends with other fibres such as cellulose, polyurethane, nylon and wool by normal exhaust dyeing, continuous dyeing and direct printing techniques are already known for example from the document WO 9704031 or EP 0 492 893. However, they have certain application defects, such as for example relatively poor leveling/migration properties, an overly large dependence of the colour yield on varying dyeing parameters in the dyeing process or an insufficient colour build-up on polyester (good colour build-up results from the ability of a dye to provide a proportionally stronger dyeing when used in higher concentrations in the dye bath), or unsatisfactory fastness properties.

Thus there is a need for disperse dyes which provide dyeings of improved colour build-up and fastness properties, i.e. wash and light fastness properties of dyed polyester or its blends with other fibres such as cellulose, polyurethane, nylon and wool.

The present invention, then, provides dye mixtures of disperse dyes which provide dyeings of very good colour build up, wet and light fastness properties on polyester or its blends with other fibres particularly in the deep black shade area.

The invention accordingly provides dye mixtures comprising one or more dyes of the herein below indicated and defined formula (I)

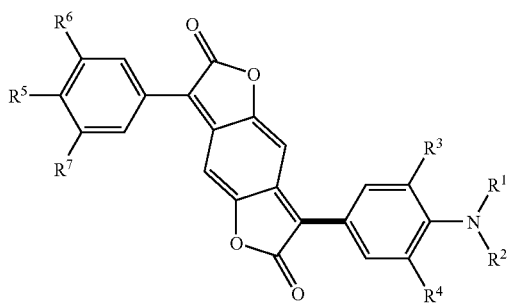

where
$R^1$ and $R^2$ are independently hydrogen, optionally substituted alkyl, alkenyl, cycloalkyl, aryl or aralkyl, or $R^1$ and $R^2$ together with the N atom can form a heterocyclic 5, 6 or 7 membered ring, $R^3$ and $R^4$ are independently hydrogen, halogen, or an optionally substituted alkyl, alkenyl or alkoxy or $R^1$ and $R^3$ together with the N atom can form a heterocyclic 5, 6 or 7 membered ring, $R^2$ and $R^4$ together with the N atom can form a heterocyclic 5, 6 or 7 membered ring, $R^5$ is hydrogen, halogen or optionally substituted alkyl or alkoxy group or is $—NR^{O1}R^{O2}$ where $R^{O1}$ and $R^{O2}$ independently have a meaning of $R^1$ and $R^2$ $R^6$ and $R^7$ are independently hydrogen, halogen, or an optionally substituted alkyl, alkenyl or alkoxy, $R^5$ and $R^6$ together with the N atom can form a heterocyclic 5, 6 or 7 membered ring, or $R^5$ and $R^7$ together with the N atom can form a heterocyclic 5, 6 or 7 membered ring and at least one dye of the herein below indicated and defined general dyes of:

formula (II),

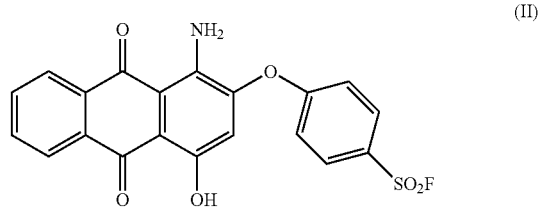

or one or more dyes of general formula (III),

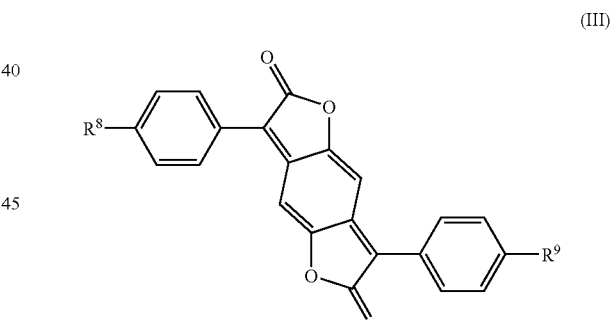

wherein
$R^8$ and $R^9$ are independently H, $C_1$-$C_4$ alkoxy, $C_1$-$C_4$ alkenyloxy [$OR^{10}$] optionally substituted by unsubstituted or substituted saturated or unsaturated 5-, 6-, or 7-membered heterocyclic or homocyclic residues or substituted alkoxy [$O(CH_2)_n R^{11}$] where
n can be an integer from 1 to 6 and
$R^{11}$ can be $OR^{12}$ or $COR^{13}$
where
$R^{12}$ is H, alkyl, alkenyl, aryl, alkoxyalkyl, aryloxyalkyl, carbonylalkyl, carbonylalkenyl, carbonylaryl, carbonylalkoxyalkyl or carbonylaryloxyalkyl, and
$R^{13}$ is alkoxy, alkenyloxy, aryloxy, arylalkoxy, aryloxyalkoxy, alkenyloxyalkoxy or alkoxyalkoxy or one or more dyes of general formula (IV),

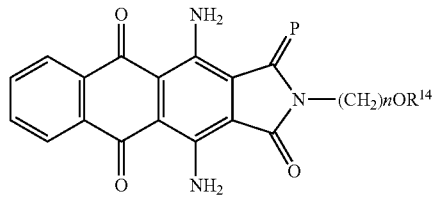

wherein P and Q are independently O or NH and where at least one and preferably both P and Q are O.

n is an integer from 1 to 4, preferably 2 or 3, $R_{14}$ is H or $C_1$-$C_4$ alkyl or a $C_1$-$C_4$ alkoxy group or alternatively, at least one of the herein below indicated and defined general dye of formula (IVa), (IVb) or (IVc).

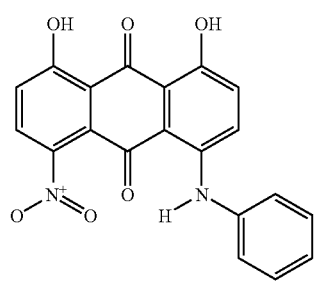

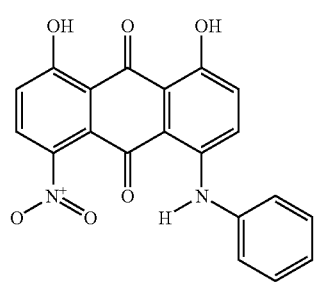

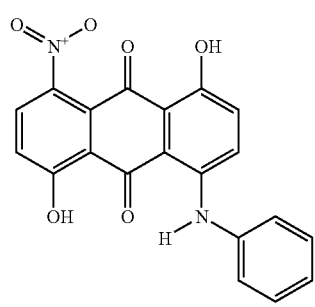

whereas the preferred ratio of these two components would be 40-50 to 50-60 and especially preferred would be 45 to 55 parts,

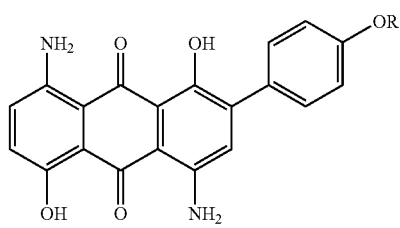

wherein R is H or $CH_3$. The preferred ratio of H to $CH_3$ would 30-70 to 70-30 and more preferred would be 40-60 to 60-40, one or more dyes of general formula (V)

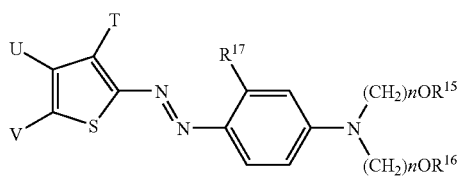

wherein

T, U and V are independently hydrogen, formyl, acetyl, chloro, bromo, cyano or nitro n=1-4

$R^{15}$ and $R^{16}$ are independently $C_1$ to $C_4$ alkyl, alkenyl, aryl, aralkyl, carbonylalkyl, carbonylalkenyl, carbonylaryl, carbonylalkoxyalkyl or carbonylaryloxyalkyl.

$R^{17}$ is hydrogen, halogen, $C_1$ to $C_4$ alkyl or $C_1$ to $C_4$ alkoxy, $NHCOR^{18}$, where $R^{18}$ is $C_1$ to $C_4$ alkyl or $C_1$ to $C_4$ alkoxy, where in case where $R^{17}$ is $NHCOR^{18}$ then $(CH_2)_nOR^{15}/R^{16}$ are replaced by $R^{19}$ and $R^{20}$ as given in structure (Va)

wherein $R^{19}$ and $R^{20}$ are independently hydrogen, alkyl, alkenyl, aryl, aralkyl, alkoxyalkyl, aryloxyalkyl, alkoxycarbonylalkyl and alkylcarbonylalkoxy.

or one or more dyes of general formula (VI)

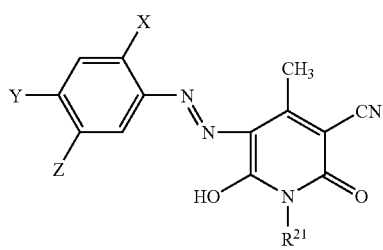

wherein
R²¹ is H, alkyl, alkoxyalkyl or aryloxyalkyl,
X is H, halogen, alkyl, nitro or cyano.
Y is independently H, halogen, alkyl, nitro, alkoxyalkoxy-akylcarbonyl, arylalkoxycarbonyl, mono or dialkylami-nocarbonyl, or alkylalkoxycarbonyl in which the alkali group can be further substituted by a 5, 6 or 7 membered (saturated or unsaturated) heterocyclic ring, or Y is

R²²SO₂ wherein R²² is aryloxy, or mono/dialkylamino
Z is independently H, hydroxyl, halogen, or R²²SO₂ wherein R²² is aryloxy, or mono/dialkylamino or Z is aryloxy-alkoxycarbonyl, or arylalkoxycarbonyl.

Preferred structures covered by the general formula (I) are for example as given in Table 1

TABLE 1

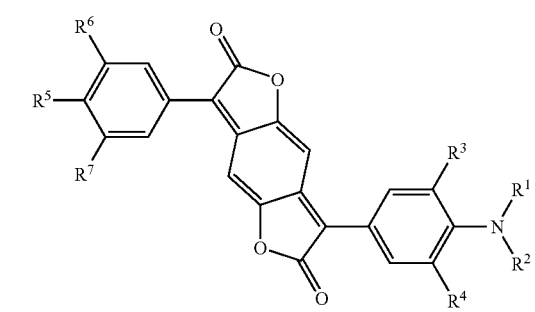

(I)

| Dye | R¹ | R² | R³ | R⁴ | R⁵ | R⁶ | R⁷ |
|---|---|---|---|---|---|---|---|
| I-1 | H | H | Methyl | H | H | H | H |
| I-2 | H | H | Ethyl | H | H | H | H |
| I-3 | H | H | Methyl | Methyl | H | H | H |
| I-4 | H | H | Chloro | H | H | H | H |
| I-5 | H | H | Iso-propyl | H | H | H | H |
| I-6 | H | H | Iso-butyl | H | H | H | H |
| I-7 | H | H | Iso-propyl | Methyl | H | H | H |
| I-8 | H | H | Iso-butyl | Methyl | H | H | H |
| I-9 | H | H | Methyl | Ethyl | H | H | H |
| I-10 | H | H | Methyl | Chloro | H | H | H |
| I-11 | H | H | Chloro | Ethyl | H | H | H |
| I-12 | H | H | Iso-propyl | Ethyl | H | H | H |
| I-13 | H | H | Iso-butyl | Ethyl | H | H | H |
| I-14 | H | H | H | Methyl | Methyl | H | H |
| I-15 | H | H | H | Methyl | Ethyl | H | H |
| I-16 | H | H | H | Methyl | Iso-propyl | H | H |
| I-17 | H | H | H | Methyl | Iso-butyl | H | H |
| I-18 | H | H | H | Ethyl | Iso-propyl | H | H |
| I-19 | H | H | H | Ethyl | Iso-butyl | H | H |
| I-20 | H | H | H | Ethyl | Methyl | H | H |
| I-21 | H | H | H | Ethyl | Ethyl | H | H |
| I-22 | H | H | Methyl | H | Methoxy | H | H |
| I-23 | H | H | Ethyl | H | Methoxy | H | H |
| I-24 | H | H | Methyl | H | Ethoxy | H | H |
| I-25 | H | H | Ethyl | H | Ethoxy | H | H |
| I-26 | H | H | Methyl | Methyl | Methoxy | H | H |
| I-27 | H | H | Methyl | Methyl | Ethoxy | H | H |
| I-28 | H | H | Methyl | H | Chloro | H | H |
| I-29 | H | H | Ethyl | H | Chloro | H | H |
| I-30 | H | H | Methyl | Methyl | Chloro | H | H |
| I-31 | H | H | Iso-propyl | H | Chloro | H | H |
| I-32 | H | H | Iso-butyl | H | Chloro | H | H |
| I-33 | H | H | Methyl | H | NHCH₃ | H | H |
| I-34 | H | H | Methyl | H | NHC₂H₅ | H | H |
| I-35 | H | H | Ethyl | H | NHCH₃ | H | H |
| I-36 | H | H | Ethyl | H | NHC₂H₅ | H | H |
| I-37 | H | H | Iso-propyl | H | NHCH₃ | H | H |
| I-38 | H | H | Iso-propyl | H | NHC₂H₅ | H | H |
| I-39 | H | H | Iso-butyl | H | NHCH₃ | H | H |
| I-40 | H | H | Iso-butyl | H | NHC₂H₅ | H | H |
| I-41 | H | H | Methyl | Methyl | NHCH₃ | H | H |

TABLE 1-continued

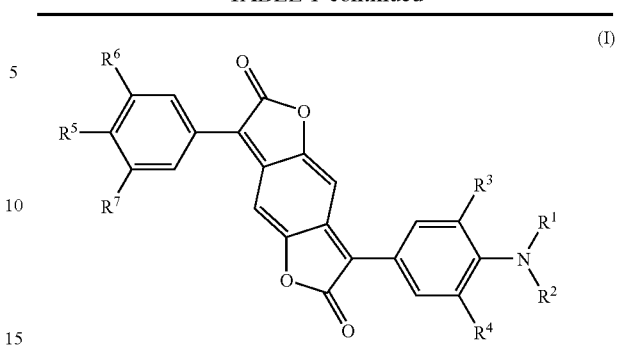

(I)

| Dye | R¹ | R² | R³ | R⁴ | R⁵ | R⁶ | R⁷ |
|---|---|---|---|---|---|---|---|
| I-42 | H | H | Methyl | Methyl | NHC₂H₅ | H | H |
| I-43 | H | H | Methyl | H | Iso-propoxy | H | H |
| I-44 | H | H | Ethyl | H | Iso-propoxy | H | H |
| I-45 | H | H | Methyl | H | Iso-butoxy | H | H |
| I-46 | H | H | Ethyl | H | Iso-butoxy | H | H |
| I-47 | H | H | Methyl | Methyl | Iso-propoxy | H | H |
| I-48 | H | H | Methyl | Methyl | Iso-butoxy | H | H |
| I-49 | H | H | Iso-propyl | H | Iso-propoxy | H | H |
| I-50 | H | H | Iso-butyl | H | Iso-butoxy | H | H |
| I-51 | Methyl | H | H | H | H | H | H |
| I-52 | Ethyl | H | H | H | H | H | H |
| I-53 | Ethyl | H | Methyl | H | H | H | H |
| I-54 | Methyl | H | Ethyl | H | H | H | H |
| I-55 | Methyl | Methyl | Methyl | H | H | H | H |
| I-56 | Methyl | Methyl | Ethyl | H | H | H | H |
| I-57 | Ethyl | Ethyl | Methyl | H | H | H | H |
| I-58 | Ethyl | Ethyl | Ethyl | H | H | H | H |
| I-59 | Methyl | Methyl | Methyl | Methyl | H | H | H |
| I-60 | Ethyl | Ethyl | Methyl | Methyl | H | H | H |

Preferred structures covered by the general formula (III) are given in table 2

TABLE 2

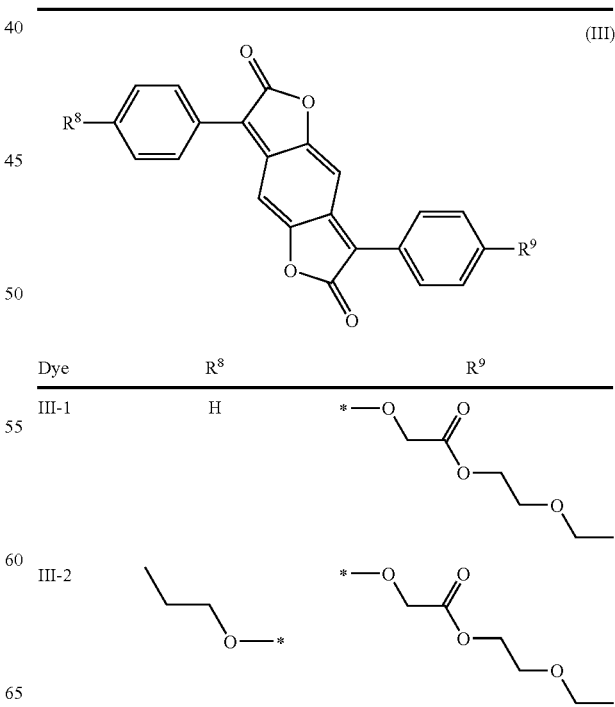

(III)

| Dye | R⁸ | R⁹ |
|---|---|---|
| III-1 | H | *—O—C(O)—CH₂—O—CH₂CH₂—O—CH₂CH₃ |
| III-2 | CH₃CH₂CH₂—O—* | *—O—C(O)—CH₂—O—CH₂CH₂—O—CH₂CH₃ |

TABLE 2-continued (III)

| Dye | R⁸ | R⁹ |
|---|---|---|
| III-3 | CH₃CH₂CH₂O—* | H |
| III-4 | CH₃CH₂O—* | H |
| III-5 | (CH₃)₂CHO—* | H |
| III-6 | CH₃CH₂CH₂CH₂O—* | H |
| III-7 | HOCH₂CH₂CH₂O—* | H |
| III-8 | (tetrahydrofuran-2-yl)CH₂O—* | H |
| III-9 | CH₃OCH₂CH₂OC(O)CH₂O—* | H |
| III-10 | CH₃OCH₂OC(O)CH₂O—* | H |
| III-11 | CH₃OCH(CH₃)OC(O)CH₂O—* | H |

TABLE 2-continued (III)

| Dye | R⁸ | R⁹ |
|---|---|---|
| III-12 | CH₃OCH₂CH₂OC(O)CH₂O—* | CH₃CH₂CH₂O—* |
| III-13 | CH₃OCH₂OC(O)CH₂O—* | CH₃CH₂O—* |
| III-14 | CH₃OCH₂CH₂OC(O)CH₂O—* | (CH₃)₂CHO—* |

Preferred structures covered by the general formula (IV) are given in table 3

TABLE 3

(IV)

| Dye | P | Q | n | R¹⁴ |
|---|---|---|---|---|
| IV-1 | O | O | 3 | $CH_3$ |
| IV-2 | O | O | 3 | $C_2H_5$ |
| IV-3 | O | O | 3 | $CH_3OC_2H_4$ |
| IV-4 | O | O | 2 | H |
| IV-5 | O | O | 3 | $C_3H_7$ |
| IV-6 | O | O | 2 | $C_4H_9$ |
| IV-7 | O | O | 3 | $(CH_3)_2CH$ |

Preferred structures covered by the general formula (V) are given in table 4

TABLE 4

(V)

[Structure: thiophene ring with substituents T, U, V, connected via N=N azo linkage to a phenyl ring bearing R$^{17}$ and N((CH$_2$)$_n$OR$^{15}$)((CH$_2$)$_n$OR$^{16}$)]

| Dye | T | U | V | n | R$^{15}$ | R$^{16}$ | R$^{17}$ |
|---|---|---|---|---|---|---|---|
| V-1 | NO$_2$ | H | NO$_2$ | 2 | CH$_3$ | CH$_3$ | H |
| V-2 | NO$_2$ | H | NO$_2$ | 2 | CH$_2$CH=CH$_2$ | CH$_2$CH=CH$_2$ | H |
| V-3 | NO$_2$ | H | NO$_2$ | 2 | Ph | Ph | H |
| V-4 | NO$_2$ | H | NO$_2$ | 2 | CH$_2$Ph | CH$_2$Ph | H |
| V-5 | NO$_2$ | H | NO$_2$ | 2 | COCH$_3$ | COCH$_3$ | H |
| V-6 | NO$_2$ | H | NO$_2$ | 2 | COC$_2$H$_5$ | COC$_2$H$_5$ | H |
| V-7 | NO$_2$ | H | NO$_2$ | 2 | CO iso-propyl | CO iso-propyl | H |
| V-8 | NO$_2$ | H | NO$_2$ | 2 | CO iso-butyl | CO iso-butyl | H |
| V-9 | NO$_2$ | H | NO$_2$ | 2 | COCH$_2$CH=CH$_2$ | COCH$_2$CH=CH$_2$ | H |
| V-10 | NO$_2$ | H | NO$_2$ | 2 | COC$_6$H$_5$ | COC$_6$H$_5$ | H |
| V-11 | NO$_2$ | H | NO$_2$ | 2 | COCH$_2$C$_6$H$_5$ | COCH$_2$C$_6$H$_5$ | H |
| V-12 | NO$_2$ | H | NO$_2$ | 2 | COOCH$_3$ | COOCH$_3$ | H |
| V-13 | NO$_2$ | H | NO$_2$ | 2 | COOC$_2$H$_5$ | COOC$_2$H$_5$ | H |
| V-14 | NO$_2$ | H | NO$_2$ | 2 | COOC$_6$H$_5$ | COOC$_6$H$_5$ | H |
| V-15 | NO$_2$ | H | NO$_2$ | 2 | COOCH$_2$C$_6$H$_5$ | COOCH$_2$C$_6$H$_5$ | H |
| V-16 | NO$_2$ | H | NO$_2$ | 2 | CH$_3$ | CH$_3$ | CH$_3$ |
| V-17 | NO$_2$ | H | NO$_2$ | 2 | CH$_2$CH=CH$_2$ | CH$_2$CH=CH$_2$ | CH$_3$ |
| V-18 | NO$_2$ | H | NO$_2$ | 2 | C$_6$H$_5$ | C$_6$H$_5$ | CH$_3$ |
| V-19 | NO$_2$ | H | NO$_2$ | 2 | CH$_2$C$_6$H$_5$ | CH$_2$C$_6$H$_5$ | CH$_3$ |
| V-20 | NO$_2$ | H | NO$_2$ | 2 | COCH$_3$ | COCH$_3$ | CH$_3$ |
| V-21 | NO$_2$ | H | NO$_2$ | 2 | COC$_2$H$_5$ | COC$_2$H$_5$ | CH$_3$ |
| V-22 | NO$_2$ | H | NO$_2$ | 2 | CO-iso-propyl | CO-iso-propyl | CH$_3$ |
| V-23 | NO$_2$ | H | NO$_2$ | 2 | CO-iso-butyl | CO-iso-butyl | CH$_3$ |
| V-24 | NO$_2$ | H | NO$_2$ | 2 | COCH$_2$CH=CH$_2$ | COCH$_2$CH=CH$_2$ | CH$_3$ |
| V-25 | NO$_2$ | H | NO$_2$ | 2 | COCH$_2$C$_6$H$_5$ | COCH$_2$C$_6$H$_5$ | CH$_3$ |
| V-26 | NO$_2$ | H | NO$_2$ | 2 | COOCH$_3$ | COOCH$_3$ | CH$_3$ |
| V-27 | NO$_2$ | H | NO$_2$ | 2 | COOC$_2$H$_5$ | COOC$_2$H$_5$ | CH$_3$ |
| V-28 | NO$_2$ | H | NO$_2$ | 2 | COOC$_6$H$_5$ | COOC$_6$H$_5$ | CH$_3$ |
| V-29 | NO$_2$ | H | NO$_2$ | 2 | COOCH$_2$C$_6$H$_5$ | COOCH$_2$C$_6$H$_5$ | CH$_3$ |
| V-30 | CN | H | NO$_2$ | 2 | CH$_2$CH=CH$_2$ | CH$_2$CH=CH$_2$ | H |
| V-31 | CN | H | NO$_2$ | 2 | C$_6$H$_5$ | C$_6$H$_5$ | H |
| V-32 | CN | H | NO$_2$ | 2 | CH$_2$C$_6$H$_5$ | CH$_2$C$_6$H$_5$ | H |
| V-33 | CN | H | NO$_2$ | 2 | COCH$_3$ | COCH$_3$ | H |
| V-34 | CN | H | NO$_2$ | 2 | COCH$_2$C$_6$H$_5$ | COCH$_2$C$_6$H$_5$ | H |
| V-35 | CN | H | NO$_2$ | 2 | COOCH$_3$ | COOCH$_3$ | H |
| V-36 | CN | H | NO$_2$ | 2 | COCH$_3$ | COCH$_3$ | CH$_3$ |
| V-37 | CN | H | NO$_2$ | 2 | COOC$_2$H$_5$ | COOC$_2$H$_5$ | CH$_3$ |
| V-38 | CN | Cl | CHO | 2 | COCH$_3$ | COCH$_3$ | H |

In case where R$^{17}$ is NHCOR$^{18}$ then (CH$_2$)$_n$OR$^{15}$/R$^{16}$ are replaced by R$^{19}$ and R$^{20}$ as given in structure (Va) wherein R$^{19}$ and R$^{20}$ are independently hydrogen, alkyl, alkenyl, aryl, aralkyl, alkoxyalkyl, aryloxyalkyl, alkoxycarbonylalkyl and alkylcarbonylalkoxy as given in table 5:

TABLE 5

| Dye | T | U | V | n | R$^{18}$ | R$^{19}$ | R$^{20}$ |
|---|---|---|---|---|---|---|---|
| Va-1 | NO$_2$ | H | NO$_2$ | 2 | CH$_3$ | C$_2$H$_5$ | C$_2$H$_5$ |
| Va-2 | NO$_2$ | H | NO$_2$ | 2 | CH$_3$ | C$_2$H$_4$OCH$_3$ | C$_2$H$_4$OCH$_3$ |
| Va-3 | NO$_2$ | H | NO$_2$ | 2 | CH$_3$ | C$_2$H$_4$OCH$_2$C$_6$H$_5$ | C$_2$H$_4$OCH$_2$C$_6$H$_5$ |
| Va-4 | NO$_2$ | H | NO$_2$ | 2 | CH$_3$ | C$_2$H$_4$OCOCH$_3$ | C$_2$H$_4$OCOCH$_3$ |
| Va-5 | NO$_2$ | H | NO$_2$ | 2 | CH$_3$ | C$_2$H$_4$OCOC$_2$H$_5$ | C$_2$H$_4$OCOC$_2$H$_5$ |
| Va-6 | NO$_2$ | H | NO$_2$ | 2 | CH$_3$ | C$_2$H$_4$OC$_6$H$_5$ | C$_2$H$_4$OC$_6$H$_5$ |
| Va-7 | NO$_2$ | H | NO$_2$ | 2 | CH$_3$ | CH$_2$CH=CH$_2$ | CH$_2$CH=CH$_2$ |
| Va-8 | NO$_2$ | H | NO$_2$ | 2 | C$_2$H$_5$ | C$_2$H$_5$ | C$_2$H$_5$ |
| Va-9 | NO$_2$ | H | NO$_2$ | 2 | C$_2$H$_5$ | C$_2$H$_4$OCH$_3$ | C$_2$H$_4$OCH$_3$ |
| Va-10 | NO$_2$ | H | NO$_2$ | 2 | C$_2$H$_5$ | C$_2$H$_4$OCH$_2$C$_6$H$_5$ | C$_2$H$_4$OCH$_2$C$_6$H$_5$ |
| Va-11 | NO$_2$ | H | NO$_2$ | 2 | C$_2$H$_5$ | C$_2$H$_4$OCOCH$_3$ | C$_2$H$_4$OCOCH$_3$ |
| Va-12 | NO$_2$ | H | NO$_2$ | 2 | C$_2$H$_5$ | C$_2$H$_4$OCOC$_2$H$_5$ | C$_2$H$_4$OCOC$_2$H$_5$ |

TABLE 5-continued

| Dye | T | U | V | n | $R^{18}$ | $R^{19}$ | $R^{20}$ |
|---|---|---|---|---|---|---|---|
| Va-13 | $NO_2$ | H | $NO_2$ | 2 | $C_2H_5$ | $C_2H_4OC_6H_5$ | $C_2H_4OC_6H_5$ |
| Va-14 | $NO_2$ | H | $NO_2$ | 2 | $C_2H_5$ | $CH_2CH\!=\!CH_2$ | $CH_2CH\!=\!CH_2$ |
| Va-15 | $NO_2$ | H | $NO_2$ | 2 | $OC_2H_5$ | $C_2H_5$ | $C_2H_5$ |
| Va-16 | $NO_2$ | H | $NO_2$ | 2 | $OC_2H_5$ | $C_2H_4OCH_3$ | $C_2H_4OCH_3$ |
| Va-17 | $NO_2$ | H | $NO_2$ | 2 | $OC_2H_5$ | $C_2H_4OCH_2C_6H_5$ | $C_2H_4OCH_2C_6H_5$ |
| Va-18 | $NO_2$ | H | $NO_2$ | 2 | $OC_2H_5$ | $C_2H_4OCOCH_3$ | $C_2H_4OCOCH_3$ |
| Va-19 | $NO_2$ | H | $NO_2$ | 2 | $OC_2H_5$ | $C_2H_4OCOC_2H_5$ | $C_2H_4OCOC_2H_5$ |
| Va-20 | $NO_2$ | H | $NO_2$ | 2 | $OC_2H_5$ | $C_2H_4OC_6H_5$ | $C_2H_4OC_6H_5$ |
| Va-21 | $NO_2$ | H | $NO_2$ | 2 | $OC_2H_5$ | $CH_2CH\!=\!CH_2$ | $CH_2CH\!=\!CH_2$ |

Preferred structures covered by the general formula (VI) are given in table 6

TABLE 6

(VI)

| Dye | X | Y | Z | $R^{21}$ |
|---|---|---|---|---|
| VI-1 | H | H | $O\cdot SO_2C_6H_5$ | $CH_3$ |
| VI-2 | $NO_2$ | H | H | $C_2H_5$ |
| VI-3 | H | $CH_3OC_2H_4OC_2H_4OOC\!-\!$ | H | $C_2H_5$ |
| VI-4 | H | H | $H/COOCH_2C_6H_5$ | $C_3H_6OCH_3$ |
| VI-5 | Cl | $NO_2$ | H | H |
| VI-6 | H | $C_4H_9(C_2H_5)CHC_2H_4NHSO_2\!-\!$ | H | $C_4H_9$ |
| VI-7 | H | $C_4H_9(C_2H_5)CHCH_2NHCO\!-\!$ | H | $CH_3$ |
| VI-8 | H | Cl | H | $-\!C_4H_9$ |
| VI-9 | H | $-\!OSO_2C_6H_5$ | H | $-\!C_3H_6OCH_3$ |
| VI-10 | H | (tetrahydrofurfuryl acetate group) | H | $-\!C_4H_9$ |
| VI-11 | H | para $(CH_3)_2CHC_6H_5CO\!-\!$ | H | H |
| VI-12 | H | $C_6H_5CH_2OCO\!-\!$ | H | $-\!C_4H_9$ |
| VI-13 | $NO_2$ | Cl | H | $C_3H_7/C_4H_9$ |
| VI-14 | H | $-\!CH_3$ | H | H |
| VI-14 | H | Cl | Cl | $-\!CH_3$ |
| VI-15 | H | Cl | Cl | $-\!C_4H_9$ |
| VI-16 | H | H | $C_6H_5OC_2H_4OOC\!-\!$ | $-\!CH_3$ |

The dyes according to the general formula (I) are known from EP 363 034 A2, mixtures of benzodifuranone dyes are known from WO 9704031.

Preferred mixtures according to the invention are two component mixtures comprising at least one dyestuff of general formula (I) and at least one dyestuff of formula (II), or at least one dyestuff of formula (IV), or at least one dyestuff of formula (V), or at least one dyestuff of formula (VI).

Especially preferred mixtures according to the invention comprise at least one dyestuff of general formula (I), one dyestuff of formula (II) and at least one dyestuff if general formula (VI).

Especially preferred are also mixtures comprising at least one dyestuff of general formula (I), dyestuff of formula (II), at least one dyestuff of general formula (IV) and at least one dyestuff of general formula (VI), as well as mixtures according to the invention comprising at least one dyestuff of the general formula (I), at least one dyestuff of the general formula (III), at least one dyestuff of the general formula (IV) and at least on dyestuff of the general formula (VI).

Furthermore are especially preferred mixtures comprising one or more dyestuffs according to the general formula (I), one or more dyestuffs of the general formula (III), one or more dyestuffs of the general formula (V) and one or more dyestuffs according to the general formula (VI), as well as mixtures according to the invention comprising one or more dyestuffs according to the general formula (I), dyestuff (II), one or more dyestuffs according to the general formula (III), one or more dyestuffs according to the general formula (V)

and one or more dyestuffs according to the general formula (VI), and dyestuff mixtures comprising one or more dyestuffs according to the general formula (I), dyestuff (II), one or more dyestuffs according to the general formula (III), one or more dyestuffs according to the general formula (IV), and one or more dyestuffs of the general formula (VI), and dyestuff mixtures comprising at least one dyestuff of the general formula (I), dyestuff (II), at least one dyestuff of the general formula (III), at least one dyestuff of the general formula (IV), at least one dyestuff of the general formula (V) and at least one dyestuff of the general formula (VI).

The preferred percentage of dye (I) in the final black mixture component or a would be 15% to 50% by weight and especially preferred would be 25% to 40% by weight.

The preferred percentage of dye (II) in the final black mixture would be 0% to 50% by weight, or 0 to 45% by weight and especially preferred would be 20% to 50% by weight.

The preferred percentage of dye (III) in the final black mixture either as the single component or a two/three component mixture would be 0% to 30% by weight and especially preferred would be 0% to 20% by weight.

The preferred percentage of dye (IV) in the final black mixture would be 0% to 40% by weight and especially preferred would be 0% to 25% by weight.

The preferred percentage of dye (V) in the final black mixture would be 0% to 30% by weight and especially preferred would be 0% to 20% by weight.

The preferred percentage of dye (VI) in the final black mixture would be 0 to 30% by weight, preferably 5% to 30% by weight and especially preferred would be 15% to 25% by weight.

Further examples of inventive mixtures are given in table 8. Ratios are given as % by weight.

TABLE 8

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 1 | I-1 | II | III-1 | IV-1 | — | VI-1 | 25:21:9:20:0:25 |
| 2 | I-2 | II | III-1 | IV-1 | — | VI-1 | 28:20:8:19:0:25 |
| 3 | I-1 | II | III-1 | IV-1 + IV-3 | — | VI-1 | 27:22:7:19:0:25 |
| 4 | I-1 | II | III-7 | IV-1 + IV-3 | — | VI-1 | 26:21:10:20:0:23 |
| 5 | I-1 | II | III-8 | IV-1 + IV-3 | — | VI-1 | 30:25:5:15:0:25 |
| 6 | I-2 | II | III-1 | IV-1 + IV-3 | — | VI-1 | 29:24:7:16:0:24 |
| 7 | I-2 | II | III-7 | IV-1 + IV-3 | — | VI-1 | 28:23:6:18:0:25 |
| 8 | I-2 | II | III-8 | IV-1 + IV-3 | — | VI-1 | 30:20:8:17:0:25 |
| 9 | I-1 + I-2 | II | III-1 | IV-1 | — | VI-1 | 27:28:5:15:0:25 |
| 10 | I-1 + I-2 | II | III-1 | IV-1 + IV-3 | — | VI-1 | 31:26:4:15:0:25 |
| 11 | I-1 + I-2 | II | III-7 | IV-1 + IV-3 | — | VI-1 | 29:25:6:16:0:24 |
| 12 | I-1 + I-2 | II | III-8 | IV-1 + IV-3 | — | VI-1 | 27:24:7:17:0:25 |
| 13 | I-1 + I-2 + I-3 | II | III-1 | IV-1 | — | VI-1 | 28:22:9:16:0:25 |
| 14 | I-1 + I-2 + I-3 | II | III-1 | IV-1 + IV-3 | — | VI-1 | 32:24:6:13:0:25 |
| 15 | I-1 + I-2 + I-3 | II | III-7 | IV-1 + IV-3 | — | VI-1 | 31:22:8:15:0:24 |
| 16 | I-1 + I-2 + I-3 | II | III-8 | IV-1 + IV-3 | — | VI-1 | 30:24:7:14:0:25 |
| 17 | I-1 | II | III-1 + III-2 | IV-1 | — | VI-1 | 27:25:6:18:0:24 |
| 18 | I-2 | II | III-1 + III-2 | IV-1 | — | VI-1 | 26:23:8:19:0:24 |
| 19 | I-1 | II | III-1 + III-2 | IV-1 + IV-3 | — | VI-1 | 27:24:7:17:0:25 |
| 20 | I-2 | II | III-1 + III-2 | IV-1 + IV-3 | — | VI-1 | 25:23:8:20:0:24 |
| 21 | I-1 + I-2 | II | III-1 + III-2 | IV-1 | — | VI-1 | 29:26:5:16:0:24 |
| 22 | I-1 + I-2 | II | III-1 + III-2 | IV-1 + IV-3 | — | VI-1 | 26:25:6:19:0:24 |
| 23 | I-1 + I-2 + I-3 | II | III-1 + III-2 | IV-1 | — | VI-1 | 29:23:9:14:0:25 |
| 24 | I-1 + I-2 + I-3 | II | III-1 + III-2 | IV-1 + IV-3 | — | VI-1 | 27:27:4:18:0:24 |
| 25 | I-1 | II | III-1 + III-2 + III-3 | IV-1 | — | VI-1 | 32:25:5:13:0:25 |
| 26 | I-2 | II | III-1 + III-2 + III-3 | IV-1 | — | VI-1 | 31:23:7:15:0:24 |
| 27 | I-1 | II | III-1 + III-2 + III-3 | IV-1 + IV-3 | — | VI-1 | 27:24:7:17:0:25 |
| 28 | I-2 | II | III-1 + III-2 + III-3 | IV-1 + IV-3 | — | VI-1 | 28:22:9:16:0:25 |
| 29 | I-1 + I-2 | II | III-1 + III-2 + III-3 | IV-1 | — | VI-1 | 32:24:6:13:0:25 |
| 30 | I-1 + I-2 | II | III-1 + III-2 + III-3 | IV-1 + IV-3 | — | VI-1 | 31:22:8:15:0:24 |
| 31 | I-1 + I-2 + I-3 | II | III-1 + III-2 + III-3 | IV-1 | — | VI-1 | 28:22:9:16:0:25 |
| 32 | I-1 + I-2 + I-3 | II | III-1 + III-2 + III-3 | IV-1 + IV-3 | — | VI-1 | 30:24:7:14:0:25 |
| 33 | I-1 | II | III-1 | IV-1 | — | VI-3 | 27:25:6:18:0:24 |
| 34 | I-2 | II | III-1 | IV-1 | — | VI-3 | 26:23:8:19:0:24 |
| 35 | I-1 | II | III-1 | IV-1 + IV-3 | — | VI-3 | 27:24:7:17:0:25 |
| 36 | I-1 | II | III-7 | IV-1 + IV-3 | — | VI-3 | 25:23:8:20:0:24 |
| 37 | I-1 | II | III-8 | IV-1 + IV-3 | — | VI-3 | 28:20:8:19:0:25 |
| 38 | I-2 | II | III-1 | IV-1 | — | VI-3 | 27:22:7:19:0:25 |
| 39 | I-2 | II | III-7 | IV-1 + IV-3 | — | VI-3 | 26:21:10:20:0:23 |
| 40 | I-1 | II | III-8 | IV-1 + IV-3 | — | VI-3 | 30:25:5:15:0:25 |
| 41 | I-1 + I-2 | II | III-1 | IV-1 | — | VI-3 | 29:24:7:16:0:24 |
| 42 | I-1 + I-2 | II | III-1 | IV-1 + IV-3 | — | VI-3 | 28:23:6:18:0:25 |
| 43 | I-1 + I-2 | II | III-7 | IV-1 + IV-3 | — | VI-3 | 30:20:8:17:0:25 |
| 44 | I-1 + I-2 | II | III-8 | IV-1 + IV-3 | — | VI-3 | 27:28:5:15:0:25 |
| 45 | I-1 + I-2 + I-3 | II | III-1 | IV-1 | — | VI-3 | 31:26:4:15:0:25 |
| 46 | I-1 + I-2 + I-3 | II | III-1 | IV-1 + IV-3 | — | VI-3 | 29:25:6:16:0:24 |
| 47 | I-1 + I-2 + I-3 | II | III-7 | IV-1 + IV-3 | — | VI-3 | 30:25:5:15:0:25 |
| 48 | I-1 + I-2 + I-3 | II | III-8 | IV-1 + IV-3 | — | VI-3 | 29:24:7:16:0:24 |
| 49 | I-1 | II | III-1 + III-2 | IV-1 | — | VI-3 | 28:23:6:18:0:25 |
| 50 | I-2 | II | III-1 + III-2 | IV-1 | — | VI-3 | 30:20:8:17:0:25 |
| 51 | I-1 | II | III-1 + III-2 | IV-1 + IV-3 | — | VI-3 | 27:28:5:15:0:25 |
| 52 | I-2 | II | III-1 + III-2 | IV-1 + IV-3 | — | VI-3 | 31:26:4:15:0:25 |
| 53 | I-1 + I-2 | II | III-1 + III-2 | IV-1 | — | VI-3 | 29:25:6:16:0:24 |

TABLE 8-continued

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 54 | I-1 + I-2 | II | III-1 + III-2 | IV-1 + IV-3 | — | VI-3 | 27:24:7:17:0:25 |
| 55 | I-1 + I-2 + I-3 | II | III-1 + III-2 | IV-1 | — | VI-3 | 28:22:9:16:0:25 |
| 56 | I-1 + I-2 + I-3 | II | III-1 + III-2 | IV-1 + IV-3 | — | VI-3 | 32:24:6:13:0:25 |
| 57 | I-1 | II | III-1 + III-2 + III-3 | IV-1 | — | VI-3 | 31:22:8:15:0:24 |
| 58 | I-2 | II | III-1 + III-2 + III-3 | IV-1 | — | VI-3 | 30:24:7:14:0:25 |
| 59 | I-1 | II | III-1 + III-2 + III-3 | IV-1 + IV-3 | — | VI-3 | 27:25:6:18:0:24 |
| 60 | I-2 | II | III-1 + III-2 + III-3 | IV-1 + IV-3 | — | VI-3 | 26:23:8:19:0:24 |
| 61 | I-1 + I-2 | II | III-1 + III-2 + III-3 | IV-1 | — | VI-3 | 27:24:7:17:0:25 |
| 62 | I-1 + I-2 | II | III-1 + III-2 + III-3 | IV-1 + IV-3 | — | VI-3 | 25:23:8:20:0:24 |
| 63 | I-1 + I-2 + I-3 | II | III-1 + III-2 + III-3 | IV-1 | — | VI-3 | 29:26:5:16:0:24 |
| 64 | I-1 + I-2 + I-3 | II | III-1 + III-2 + III-3 | IV-1 + IV-3 | — | VI-3 | 26:25:6:19:0:24 |
| 65 | I-1 | II | III-1 | IV-1 | — | VI-3 | 29:23:9:14:0:25 |
| 66 | I-2 | II | III-1 | IV-1 | — | VI-3 | 27:27:4:18:0:24 |
| 67 | I-1 | II | III-1 | IV-1 + IV-3 | — | VI-3 | 32:25:5:13:0:25 |
| 68 | I-2 | II | III-1 | IV-1 + IV-3 | — | VI-3 | 31:23:7:15:0:24 |
| 69 | I-1 + I-2 | II | III-1 | IV-1 | — | VI-3 | 30:20:8:17:0:25 |
| 70 | I-1 + I-2 | II | III-1 | IV-1 + IV-3 | — | VI-3 | 27:28:5:15:0:25 |
| 71 | I-1 + I-2 + I-3 | II | III-1 | IV-1 | — | VI-3 | 31:26:4:15:0:25 |
| 72 | I-1 + I-2 + I-3 | II | III-1 | IV-1 + IV-3 | — | VI-3 | 29:25:6:16:0:24 |
| 73 | I-1 | II | III-1 | IV-1 | — | VI-16 | 27:24:7:17:0:25 |
| 74 | I-2 | II | III-1 | IV-1 | — | VI-16 | 28:22:9:16:0:25 |
| 75 | I-1 | II | III-1 | IV-1 + IV-3 | — | VI-16 | 32:24:6:13:0:25 |
| 76 | I-1 | II | III-7 | IV-1 + IV-3 | — | VI-16 | 31:22:8:15:0:24 |
| 77 | I-1 | II | III-8 | IV-1 + IV-3 | — | VI-16 | 30:24:7:14:0:25 |
| 78 | I-2 | II | III-1 | IV-1 + IV-3 | — | VI-16 | 27:25:6:18:0:24 |
| 79 | I-2 | II | III-7 | IV-1 + IV-3 | — | VI-16 | 26:23:8:19:0:24 |
| 80 | I-2 | II | III-8 | IV-1 + IV-3 | — | VI-16 | 27:24:7:17:0:25 |
| 81 | I-1 + I-2 | II | III-1 | IV-1 | — | VI-16 | 25:23:8:20:0:24 |
| 82 | I-1 + I-2 | II | III-1 | IV-1 + IV-3 | — | VI-16 | 29:26:5:16:0:24 |
| 83 | I-1 + I-2 | II | III-7 | IV-1 + IV-3 | — | VI-16 | 26:25:6:19:0:24 |
| 84 | I-1 + I-2 | II | III-8 | IV-1 + IV-3 | — | VI-16 | 29:23:9:14:0:25 |
| 85 | I-1 | II | III-1 + III-2 | IV-1 | — | VI-16 | 27:27:4:18:0:24 |
| 86 | I-2 | II | III-1 + III-2 | IV-1 | — | VI-16 | 32:25:5:13:0:25 |
| 87 | I-1 | II | III-1 + III-2 | IV-1 + IV-3 | — | VI-16 | 31:23:7:15:0:24 |
| 88 | I-2 | II | III-1 + III-2 | IV-1 + IV-3 | — | VI-16 | 29:24:7:16:0:24 |
| 89 | I-1 + I-2 | II | III-1 + III-2 | IV-1 | — | VI-16 | 28:23:6:18:0:25 |
| 90 | I-1 + I-2 | II | III-1 + III-2 | IV-1 + IV-3 | — | VI-16 | 30:20:8:17:0:25 |
| 91 | I-1 + I-2 + I-3 | II | III-1 + III-2 | IV-1 | — | VI-16 | 27:28:5:15:0:25 |
| 92 | I-1 + I-2 + I-3 | II | III-1 + III-2 | IV-1 + IV-3 | — | VI-16 | 31:26:4:15:0:25 |
| 93 | I-1 | II | III-1 + III-2 + III-3 | IV-1 | — | VI-16 | 29:25:6:16:0:24 |
| 94 | I-2 | II | III-1 + III-2 + III-3 | IV-1 | — | VI-16 | 27:24:7:17:0:25 |
| 95 | I-1 | II | III-1 + III-2 + III-3 | IV-1 + IV-3 | — | VI-16 | 28:22:9:16:0:25 |
| 96 | I-2 | II | III-1 + III-2 + III-3 | IV-1 + IV-3 | — | VI-16 | 32:24:6:13:0:25 |
| 97 | I-1 + I-2 | II | III-1 + III-2 + III-3 | IV-1 | — | VI-16 | 31:22:8:15:0:24 |
| 98 | I-1 + I-2 | II | III-1 + III-2 + III-3 | IV-1 + IV-3 | — | VI-16 | 30:24:7:14:0:25 |
| 99 | I-1 + I-2 + I-3 | II | III-1 + III-2 + III-3 | IV-1 | — | VI-16 | 27:25:6:18:0:24 |
| 100 | I-1 + I-2 + I-3 | II | III-1 + III-2 + III-3 | IV-1 + IV-3 | — | VI-16 | 26:23:8:19:0:24 |
| 101 | I-1 + I-2 + I-3 | II | III-7 | IV-1 + IV-3 | — | VI-16 | 27:24:7:17:0:25 |
| 102 | I-1 + I-2 + I-3 | II | III-8 | IV-1 + IV-3 | — | VI-16 | 25:23:8:20:0:24 |
| 103 | I-1 | II | III-1 | IV-1 | — | VI-4 | 29:26:5:16:0:24 |
| 104 | I-2 | II | III-1 | IV-1 | — | VI-4 | 26:25:6:19:0:24 |
| 105 | I-1 | II | III-1 | IV-1 + IV-3 | — | VI-4 | 29:23:9:14:0:25 |
| 106 | I-1 | II | III-7 | IV-1 + IV-3 | — | VI-4 | 27:27:4:18:0:24 |
| 107 | I-1 | II | III-8 | IV-1 + IV-3 | — | VI-4 | 32:25:5:13:0:25 |
| 108 | I-2 | II | III-1 | IV-1 + IV-3 | — | VI-4 | 31:23:7:15:0:24 |
| 109 | I-2 | II | III-7 | IV-1 + IV-3 | — | VI-4 | 30:20:8:17:0:25 |
| 110 | I-2 | II | III-8 | IV-1 + IV-3 | — | VI-4 | 27:28:5:15:0:25 |
| 111 | I-1 + I-2 | II | III-1 | IV-1 | — | VI-4 | 31:26:4:15:0:25 |
| 112 | I-1 | II | III-1 + III-2 | IV-1 | — | VI-4 | 29:25:6:16:0:24 |
| 113 | I-2 | II | III-1 + III-2 | IV-1 | — | VI-4 | 27:24:7:17:0:25 |
| 114 | I-1 | II | III-1 + III-2 | IV-1 + IV-3 | — | VI-4 | 28:22:9:16:0:25 |
| 115 | I-2 | II | III-1 + III-2 | IV-1 + IV-3 | — | VI-4 | 32:24:6:13:0:25 |
| 116 | I-1 + I-2 | II | III-1 + III-2 | IV-1 | — | VI-4 | 31:22:8:15:0:24 |
| 117 | I-1 + I-2 | II | III-1 + III-2 | IV-1 + IV-3 | — | VI-4 | 30:24:7:14:0:25 |
| 118 | I-1 + I-2 | II | III-7 | IV-1 + IV-3 | — | VI-4 | 27:25:6:18:0:24 |
| 119 | I-1 + I-2 | II | III-8 | IV-1 + IV-3 | — | VI-4 | 26:23:8:19:0:24 |
| 120 | I-1 + I-2 + I-3 | II | III-1 + III-2 | IV-1 | — | VI-4 | 27:24:7:17:0:25 |
| 121 | I-1 + I-2 + I-3 | II | III-1 + III-2 | IV-1 + IV-3 | — | VI-4 | 25:23:8:20:0:24 |
| 122 | I-1 | II | III-1 + III-2 + III-3 | IV-1 | — | VI-4 | 29:26:5:16:0:24 |
| 123 | I-2 | II | III-1 + III-2 + III-3 | IV-1 | — | VI-4 | 26:25:6:19:0:24 |
| 124 | I-1 | II | III-1 + III-2 + III-3 | IV-1 + IV-3 | — | VI-4 | 29:23:9:14:0:25 |
| 125 | I-2 | II | III-1 + III-2 + III-3 | IV-1 + IV-3 | — | VI-4 | 27:27:4:18:0:24 |
| 126 | I-1 + I-2 | II | III-1 + III-2 + III-3 | IV-1 | — | VI-4 | 32:25:5:13:0:25 |
| 127 | I-1 + I-2 | II | III-1 + III-2 + III-3 | IV-1 + IV-3 | — | VI-4 | 31:23:7:15:0:24 |
| 128 | I-1 + I-2 + I-3 | II | III-1 + III-2 + III-3 | IV-1 | — | VI-4 | 29:24:7:16:0:24 |
| 129 | I-1 + I-2 + I-3 | II | III-1 + III-2 + III-3 | IV-1 + IV-3 | — | VI-4 | 28:23:6:18:0:25 |
| 130 | I-1 + I-2 + I-3 | II | III-7 | IV-1 + IV-3 | — | VI-4 | 30:20:8:17:0:25 |

TABLE 8-continued

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 131 | I-1 + I-2 + I-3 | II | III-8 | IV-1 + IV-3 | — | VI-4 | 27:28:5:15:0:25 |
| 132 | I-1 | II | III-1 | IV-1 | — | VI-2 | 31:26:4:15:0:25 |
| 133 | I-2 | II | III-1 | IV-1 | — | VI-2 | 29:25:6:16:0:24 |
| 134 | I-1 | II | III-1 | IV-1 + IV-3 | — | VI-2 | 27:24:7:17:0:25 |
| 135 | I-1 | II | III-7 | IV-1 + IV-3 | — | VI-2 | 28:22:9:16:0:25 |
| 136 | I-1 | II | III-8 | IV-1 + IV-3 | — | VI-2 | 32:24:6:13:0:25 |
| 137 | I-2 | II | III-1 | IV-1 + IV-3 | — | VI-2 | 31:22:8:15:0:24 |
| 138 | I-2 | II | III-7 | IV-1 + IV-3 | — | VI-2 | 30:24:7:14:0:25 |
| 139 | I-2 | II | III-8 | IV-1 + IV-3 | — | VI-2 | 27:25:6:18:0:24 |
| 140 | I-1 + I-2 | II | III-1 | IV-1 | — | VI-2 | 26:23:8:19:0:24 |
| 141 | I-1 | II | III-1 + III-2 | IV-1 | — | VI-2 | 27:24:7:17:0:25 |
| 142 | I-2 | II | III-1 + III-2 | IV-1 | — | VI-2 | 25:23:8:20:0:24 |
| 143 | I-1 | II | III-1 + III-2 | IV-1 + IV-3 | — | VI-2 | 29:26:5:16:0:24 |
| 144 | I-2 | II | III-1 + III-2 | IV-1 + IV-3 | — | VI-2 | 26:25:6:19:0:24 |
| 145 | I-1 + I-2 | II | III-1 + III-2 | IV-1 | — | VI-2 | 29:23:9:14:0:25 |
| 146 | I-1 + I-2 | II | III-1 + III-2 | IV-1 + IV-3 | — | VI-2 | 27:27:4:18:0:24 |
| 147 | I-1 + I-2 | II | III-7 | IV-1 + IV-3 | — | VI-2 | 32:25:5:13:0:25 |
| 148 | I-1 + I-2 | II | III-8 | IV-1 + IV-3 | — | VI-2 | 31:23:7:15:0:24 |
| 149 | I-1 + I-2 + I-3 | II | III-1 + III-2 | IV-1 | — | VI-2 | 30:20:8:17:0:25 |
| 150 | I-1 + I-2 + I-3 | II | III-1 + III-2 | IV-1 + IV-3 | — | VI-2 | 27:28:5:15:0:25 |
| 151 | I-1 | II | III-1 + III-2 + III-3 | IV-1 | — | VI-2 | 31:26:4:15:0:25 |
| 152 | I-2 | II | III-1 + III-2 + III-3 | IV-1 | — | VI-2 | 29:25:6:16:0:24 |
| 153 | I-1 | II | III-1 + III-2 + III-3 | IV-1 + IV-3 | — | VI-2 | 27:24:7:17:0:25 |
| 154 | I-2 | II | III-1 + III-2 + III-3 | IV-1 + IV-3 | — | VI-2 | 28:22:9:16:0:25 |
| 155 | I-1 + I-2 | II | III-1 + III-2 + III-3 | IV-1 | — | VI-2 | 32:24:6:13:0:25 |
| 156 | I-1 + I-2 | II | III-1 + III-2 + III-3 | IV-1 + IV-3 | — | VI-2 | 31:22:8:15:0:24 |
| 157 | I-1 + I-2 + I-3 | II | III-1 + III-2 + III-3 | IV-1 | — | VI-2 | 30:24:7:14:0:25 |
| 158 | I-1 + I-2 + I-3 | II | III-1 + III-2 + III-3 | IV-1 + IV-3 | — | VI-2 | 27:25:6:18:0:24 |
| 159 | I-1 + I-2 + I-3 | II | III-7 | IV-1 + IV-3 | — | VI-2 | 26:23:8:19:0:24 |
| 160 | I-1 + I-2 + I-3 | II | III-8 | IV-1 + IV-3 | — | VI-2 | 27:24:7:17:0:25 |
| 161 | I-1 | II | III-1 | IV-1 | — | VI-5 | 25:23:8:20:0:24 |
| 162 | I-2 | II | III-1 | IV-1 | — | VI-5 | 29:26:5:16:0:24 |
| 163 | I-1 | II | III-1 | IV-1 + IV-3 | — | VI-5 | 26:25:6:19:0:24 |
| 164 | I-1 | II | III-7 | IV-1 + IV-3 | — | VI-5 | 29:23:9:14:0:25 |
| 165 | I-1 | II | III-8 | IV-1 + IV-3 | — | VI-5 | 27:27:4:18:0:24 |
| 166 | I-2 | II | III-1 | IV-1 + IV-3 | — | VI-5 | 32:25:5:13:0:25 |
| 167 | I-2 | II | III-7 | IV-1 + IV-3 | — | VI-5 | 31:23:7:15:0:24 |
| 168 | I-2 | II | III-8 | IV-1 + IV-3 | — | VI-5 | 29:24:7:16:0:24 |
| 169 | I-1 + I-2 | II | III-1 | IV-1 | — | VI-5 | 28:23:6:18:0:25 |
| 170 | I-1 | II | III-1 + III-2 | IV-1 | — | VI-5 | 30:20:8:17:0:25 |
| 171 | I-2 | II | III-1 + III-2 | IV-1 | — | VI-5 | 27:28:5:15:0:25 |
| 172 | I-1 | II | III-1 + III-2 | IV-1 + IV-3 | — | VI-5 | 31:26:4:15:0:25 |
| 173 | I-2 | II | III-1 + III-2 | IV-1 + IV-3 | — | VI-5 | 29:25:6:16:0:24 |
| 174 | I-1 + I-2 | II | III-1 + III-2 | IV-1 | — | VI-5 | 27:24:7:17:0:25 |
| 175 | I-1 + I-2 | II | III-1 + III-2 | IV-1 + IV-3 | — | VI-5 | 28:22:9:16:0:25 |
| 176 | I-1 + I-2 | II | III-7 | IV-1 + IV-3 | — | VI-5 | 25:21:9:20:0:25 |
| 177 | I-1 + I-2 | II | III-8 | IV-1 + IV-3 | — | VI-5 | 28:20:8:19:0:25 |
| 178 | I-1 + I-2 + I-3 | II | III-1 + III-2 | IV-1 | — | VI-5 | 27:22:7:19:0:25 |
| 179 | I-1 + I-2 + I-3 | II | III-1 + III-2 | IV-1 + IV-3 | — | VI-5 | 26:21:10:20:0:23 |
| 180 | I-1 + I-2 + I-3 | II | III-7 | IV-1 + IV-3 | — | VI-5 | 30:25:5:15:0:25 |
| 181 | I-1 + I-2 + I-3 | II | III-8 | IV-1 + IV-3 | — | VI-5 | 29:24:7:16:0:24 |
| 182 | I-1 | II | III-1 + III-2 + III-3 | IV-1 | — | VI-5 | 28:23:6:18:0:25 |
| 183 | I-2 | II | III-1 + III-2 + III-3 | IV-1 | — | VI-5 | 30:20:8:17:0:25 |
| 184 | I-1 | II | III-1 + III-2 + III-3 | IV-1 + IV-3 | — | VI-5 | 27:28:5:15:0:25 |
| 185 | I-2 | II | III-1 + III-2 + III-3 | I-1 + I-2 + I-3 | — | VI-5 | 31:26:4:15:0:25 |
| 186 | I-1 + I-2 | II | III-1 + III-2 + III-3 | IV-1 | — | VI-5 | 29:25:6:16:0:24 |
| 187 | I-1 + I-2 | II | III-1 + III-2 + III-3 | IV-1 + IV-3 | — | VI-5 | 27:24:7:17:0:25 |
| 188 | I-1 + I-2 + I-3 | II | III-1 + III-2 + III-3 | IV-1 | — | VI-5 | 28:22:9:16:0:25 |
| 189 | I-1 + I-2 + I-3 | II | III-1 + III-2 + III-3 | IV-1 + IV-3 | — | VI-5 | 32:24:6:13:0:25 |
| 190 | I-1 | II | III-1 | IV-1 | — | VI-9 | 31:22:8:15:0:24 |
| 191 | I-2 | II | III-1 | IV-1 | — | VI-9 | 30:24:7:14:0:25 |
| 192 | I-1 | II | III-1 | IV-1 + IV-3 | — | VI-9 | 27:25:6:18:0:24 |
| 193 | I-2 | II | III-1 | IV-1 + IV-3 | — | VI-9 | 26:23:8:19:0:24 |
| 194 | I-1 + I-2 | II | III-1 | IV-1 | — | VI-9 | 27:24:7:17:0:25 |
| 195 | I-1 | II | III-1 + III-2 | IV-1 | — | VI-9 | 25:23:8:20:0:24 |
| 196 | I-2 | II | III-1 + III-2 | IV-1 | — | VI-9 | 29:26:5:16:0:24 |
| 197 | I-1 | II | III-1 + III-2 | IV-1 + IV-3 | — | VI-9 | 26:25:6:19:0:24 |
| 198 | I-1 | II | III-7 | IV-1 + IV-3 | — | VI-9 | 29:23:9:14:0:25 |
| 199 | I-1 | II | III-8 | IV-1 + IV-3 | — | VI-9 | 27:27:4:18:0:24 |
| 200 | I-2 | II | III-1 + III-2 | IV-1 + IV-3 | — | VI-9 | 32:25:5:13:0:25 |
| 201 | I-2 | II | III-7 | IV-1 + IV-3 | — | VI-9 | 31:23:7:15:0:24 |
| 202 | I-2 | II | III-8 | IV-1 + IV-3 | — | VI-9 | 25:21:9:20:0:25 |
| 203 | I-1 + I-2 | II | III-1 + III-2 | IV-1 | — | VI-9 | 28:20:8:19:0:25 |
| 204 | I-1 + I-2 | II | III-1 + III-2 | IV-1 + IV-3 | — | VI-9 | 27:22:7:19:0:25 |
| 205 | I-1 + I-2 + I-3 | II | III-1 + III-2 | IV-1 | — | VI-9 | 26:21:10:20:0:23 |
| 206 | I-1 + I-2 + I-3 | II | III-1 + III-2 | IV-1 + IV-3 | — | VI-9 | 30:25:5:15:0:25 |
| 207 | I-1 | II | III-1 + III-2 + III-3 | IV-1 | — | VI-9 | 29:24:7:16:0:24 |

TABLE 8-continued

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 208 | I-2 | II | III-1 + III-2 + III-3 | IV-1 | — | VI-9 | 28:23:6:18:0:25 |
| 209 | I-1 | II | III-1 + III-2 + III-3 | IV-1 + IV-3 | — | VI-9 | 30:20:8:17:0:25 |
| 210 | I-2 | II | III-1 + III-2 + III-3 | IV-1 + IV-3 | — | VI-9 | 27:28:5:15:0:25 |
| 211 | I-1 + I-2 | II | III-1 + III-2 + III-3 | IV-1 | — | VI-9 | 31:26:4:15:0:25 |
| 212 | I-1 + I-2 | II | III-1 + III-2 + III-3 | IV-1 + IV-3 | — | VI-9 | 29:25:6:16:0:24 |
| 213 | I-1 + I-2 + I-3 | II | III-1 + III-2 + III-3 | IV-1 | — | VI-9 | 27:24:7:17:0:25 |
| 214 | I-1 + I-2 + I-3 | II | III-1 + III-2 + III-3 | IV-1 + IV-3 | — | VI-9 | 28:22:9:16:0:25 |
| 215 | I-1 + I-2 + I-3 | II | III-7 | IV-1 + IV-3 | — | VI-9 | 32:24:6:13:0:25 |
| 216 | I-1 + I-2 + I-3 | II | III-8 | IV-1 + IV-3 | — | VI-9 | 31:22:8:15:0:24 |
| 217 | I-1 | II | III-1 | IV-1 | — | VI-10 | 30:24:7:14:0:25 |
| 218 | I-2 | II | III-1 | IV-1 | — | VI-10 | 27:25:6:18:0:24 |
| 219 | I-1 | II | III-1 | IV-1 + IV-3 | — | VI-10 | 26:23:8:19:0:24 |
| 220 | I-1 | II | III-7 | IV-1 + IV-3 | — | VI-10 | 27:24:7:17:0:25 |
| 221 | I-1 | II | III-8 | IV-1 + IV-3 | — | VI-10 | 25:23:8:20:0:24 |
| 222 | I-2 | II | III-1 | IV-1 + IV-3 | — | VI-10 | 29:26:5:16:0:24 |
| 223 | I-2 | II | III-7 | IV-1 + IV-3 | — | VI-10 | 26:25:6:19:0:24 |
| 224 | I-2 | II | III-8 | IV-1 + IV-3 | — | VI-10 | 29:23:9:14:0:25 |
| 225 | I-1 + I-2 | II | III-1 | IV-1 | — | VI-10 | 27:27:4:18:0:24 |
| 226 | I-1 | II | III-1 + III-2 | IV-1 | — | VI-10 | 32:25:5:13:0:25 |
| 227 | I-2 | II | III-1 + III-2 | IV-1 | — | VI-10 | 31:23:7:15:0:24 |
| 228 | I-1 | II | III-1 + III-2 | IV-1 + IV-3 | — | VI-10 | 25:21:9:20:0:25 |
| 229 | I-2 | II | III-1 + III-2 | IV-1 + IV-3 | — | VI-10 | 28:20:8:19:0:25 |
| 230 | I-1 + I-2 | II | III-1 + III-2 | IV-1 | — | VI-10 | 27:22:7:19:0:25 |
| 231 | I-1 + I-2 | II | III-1 + III-2 | IV-1 + IV-3 | — | VI-10 | 26:21:10:20:0:23 |
| 232 | I-1 + I-2 | II | III-7 | IV-1 + IV-3 | — | VI-10 | 30:25:5:15:0:25 |
| 233 | I-1 + I-2 | II | III-8 | IV-1 + IV-3 | — | VI-10 | 29:24:7:16:0:24 |
| 234 | I-1 + I-2 + I-3 | II | III-1 + III-2 | IV-1 | — | VI-10 | 28:23:6:18:0:25 |
| 235 | I-1 + I-2 + I-3 | II | III-1 + III-2 | IV-1 + IV-3 | — | VI-10 | 30:20:8:17:0:25 |
| 236 | I-1 | II | III-1 + III-2 + III-3 | IV-1 | — | VI-10 | 27:28:5:15:0:25 |
| 237 | I-2 | II | III-1 + III-2 + III-3 | IV-1 | — | VI-10 | 31:26:4:15:0:25 |
| 238 | I-1 | II | III-1 + III-2 + III-3 | IV-1 + IV-3 | — | VI-10 | 29:25:6:16:0:24 |
| 239 | I-2 | II | III-1 + III-2 + III-3 | IV-1 + IV-3 | — | VI-10 | 27:24:7:17:0:25 |
| 240 | I-1 + I-2 | II | III-1 + III-2 + III-3 | IV-1 | — | VI-10 | 28:22:9:16:0:25 |
| 241 | I-1 + I-2 | II | III-1 + III-2 + III-3 | IV-1 + IV-3 | — | VI-10 | 32:24:6:13:0:25 |
| 242 | I-1 + I-2 + I-3 | II | III-1 + III-2 + III-3 | IV-1 | — | VI-10 | 31:22:8:15:0:24 |
| 243 | I-1 + I-2 + I-3 | II | III-1 + III-2 + III-3 | IV-1 + IV-3 | — | VI-10 | 30:24:7:14:0:25 |
| 244 | I-1 + I-2 + I-3 | II | III-7 | IV-1 + IV-3 | — | VI-10 | 27:25:6:18:0:24 |
| 245 | I-1 + I-2 + I-3 | II | III-7 | IV-1 + IV-3 | — | VI-10 | 26:23:8:19:0:24 |
| 246 | I-1 | II | III-1 | IV-1 | — | VI-12 | 29:23:6:18:0:24 |
| 247 | I-2 | II | III-1 | IV-1 | — | VI-12 | 27:24:7:17:0:25 |
| 248 | I-1 | II | III-1 | IV-1 + IV-3 | — | VI-12 | 25:23:8:20:0:24 |
| 250 | I-1 | II | III-7 | IV-1 + IV-3 | — | VI-12 | 29:26:5:16:0:24 |
| 251 | I-1 | II | III-8 | IV-1 + IV-3 | — | VI-12 | 26:25:6:19:0:24 |
| 252 | I-2 | II | III-1 | IV-1 + IV-3 | — | VI-12 | 29:23:9:14:0:25 |
| 253 | I-2 | II | III-7 | IV-1 + IV-3 | — | VI-12 | 27:27:4:18:0:24 |
| 254 | I-2 | II | III-8 | IV-1 + IV-3 | — | VI-12 | 32:25:5:13:0:25 |
| 255 | I-1 + I-2 | II | III-1 | IV-1 | — | VI-12 | 31:23:7:15:0:24 |
| 256 | I-1 | II | III-1 + III-2 | IV-1 | — | VI-12 | 25:21:9:20:0:25 |
| 257 | I-2 | II | III-1 + III-2 | IV-1 | — | VI-12 | 28:20:8:19:0:25 |
| 258 | I-1 | II | III-1 + III-2 | IV-1 + IV-3 | — | VI-12 | 27:22:7:19:0:25 |
| 259 | I-2 | II | III-1 + III-2 | IV-1 + IV-3 | — | VI-12 | 26:21:10:20:0:23 |
| 260 | I-1 + I-2 | II | III-1 + III-2 | IV-1 | — | VI-12 | 30:25:5:15:0:25 |
| 261 | I-1 + I-2 | II | III-1 + III-2 | IV-1 + IV-3 | — | VI-12 | 29:24:7:16:0:24 |
| 262 | I-1 + I-2 | II | III-7 | IV-1 + IV-3 | — | VI-12 | 28:23:6:18:0:25 |
| 263 | I-1 + I-2 | II | III-8 | IV-1 + IV-3 | — | VI-12 | 30:20:8:17:0:25 |
| 264 | I-1 + I-2 + I-3 | II | III-1 + III-2 | IV-1 | — | VI-12 | 27:28:5:15:0:25 |
| 265 | I-1 + I-2 + I-3 | II | III-1 + III-2 | IV-1 + IV-3 | — | VI-12 | 31:26:4:15:0:25 |
| 266 | I-1 + I-2 + I-3 | II | III-7 | IV-1 + IV-3 | — | VI-12 | 29:25:6:16:0:24 |
| 267 | I-1 + I-2 + I-3 | II | III-8 | IV-1 + IV-3 | — | VI-12 | 27:24:7:17:0:25 |
| 268 | I-1 | II | III-1 + III-2 + III-3 | IV-1 | — | VI-12 | 28:22:9:16:0:25 |
| 269 | I-2 | II | III-1 + III-2 + III-3 | IV-1 | — | VI-12 | 32:24:6:13:0:25 |
| 270 | I-1 | II | III-1 + III-2 + III-3 | IV-1 + IV-3 | — | VI-12 | 31:22:8:15:0:24 |
| 271 | I-2 | II | III-1 + III-2 + III-3 | IV-1 + IV-3 | — | VI-12 | 30:24:7:14:0:25 |
| 272 | I-1 + I-2 | II | III-1 + III-2 + III-3 | IV-1 | — | VI-12 | 27:25:6:18:0:25 |
| 273 | I-1 + I-2 | II | III-1 + III-2 + III-3 | IV-1 + IV-3 | — | VI-12 | 26:23:8:19:0:25 |
| 274 | I-1 + I-2 + I-3 | II | III-1 + III-2 + III-3 | IV-1 | — | VI-12 | 27:24:7:17:0:25 |
| 275 | I-1 + I-2 + I-3 | II | III-1 + III-2 + III-3 | IV-1 + IV-3 | — | VI-12 | 25:23:8:20:0:24 |
| 276 | I-1 | II | III-1 | IV-1 | V-5 | VI-1 | 25:25:4:14:8:24 |
| 277 | I-2 | II | III-1 | IV-1 | V-5 | VI-1 | 25:25:4:14:8:24 |
| 278 | I-1 | II | III-1 | IV-1 + IV-3 | V-5 | VI-1 | 25:25:4:14:8:24 |
| 279 | I-1 | II | III-7 | IV-1 + IV-3 | V-5 | VI-1 | 25:25:4:14:8:24 |
| 280 | I-1 | II | III-8 | IV-1 + IV-3 | V-5 | VI-1 | 25:25:4:14:8:24 |
| 281 | I-2 | II | III-1 | IV-1 + IV-3 | V-5 | VI-1 | 27:24:5:11:8:25 |
| 282 | I-2 | II | III-7 | IV-1 + IV-3 | V-5 | VI-1 | 27:24:5:11:8:25 |
| 283 | I-2 | II | III-8 | IV-1 + IV-3 | V-5 | VI-1 | 27:24:5:11:8:25 |
| 284 | I-1 + I-2 | II | III-1 | IV-1 | V-5 | VI-1 | 26:29:3:8:10:24 |
| 285 | I-1 | II | III-1 + III-2 | IV-1 | V-5 | VI-1 | 26:29:3:8:10:24 |

TABLE 8-continued

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 286 | I-2 | II | III-1 + III-2 | IV-1 | V-5 | VI-1 | 26:29:3:8:10:24 |
| 287 | I-1 | II | III-1 + III-2 | IV-1 + IV-3 | V-5 | VI-1 | 26:29:3:8:10:24 |
| 288 | I-2 | II | III-1 + III-2 | IV-1 + IV-3 | V-5 | VI-1 | 30:25:7:6:8:24 |
| 289 | I-1 + I-2 | II | III-1 + III-2 | IV-1 | V-5 | VI-1 | 30:25:7:6:8:24 |
| 290 | I-1 + I-2 | II | III-1 + III-2 | IV-1 + IV-3 | V-5 | VI-1 | 30:25:7:6:8:24 |
| 291 | I-1 + I-2 | II | III-7 | IV-1 + IV-3 | V-5 | VI-1 | 30:25:7:6:8:24 |
| 292 | I-1 + I-2 | II | III-8 | IV-1 + IV-3 | V-5 | VI-1 | 30:25:7:6:8:24 |
| 293 | I-1 + I-2 + I-3 | II | III-1 + III-2 | IV-1 | V-5 | VI-1 | 28:21:9:9:7:24 |
| 294 | I-1 + I-2 + I-3 | II | III-1 + III-2 | IV-1 + IV-3 | V-5 | VI-1 | 28:21:9:9:7:24 |
| 295 | I-1 | II | III-1 + III-2 + III-3 | IV-1 | V-5 | VI-1 | 28:21:9:9:7:24 |
| 296 | I-2 | II | III-1 + III-2 + III-3 | IV-1 | V-5 | VI-1 | 28:21:9:9:7:24 |
| 297 | I-1 | II | III-1 + III-2 + III-3 | IV-1 + IV-3 | V-5 | VI-1 | 28:21:9:9:7:24 |
| 298 | I-2 | II | III-1 + III-2 + III-3 | IV-1 + IV-3 | V-5 | VI-1 | 25:25:4:14:8:24 |
| 299 | I-1 + I-2 | II | III-1 + III-2 + III-3 | IV-1 | V-5 | VI-1 | 27:24:5:11:8:25 |
| 300 | I-1 + I-2 | II | III-1 + III-2 + III-3 | IV-1 + IV-3 | V-5 | VI-1 | 26:29:3:8:10:24 |
| 301 | I-1 + I-2 + I-3 | II | III-1 + III-2 + III-3 | IV-1 | V-5 | VI-1 | 27:24:6:11:8:25 |
| 302 | I-1 + I-2 + I-3 | II | III-1 + III-2 + III-3 | IV-1 + IV-3 | V-5 | VI-1 | 25:25:4:14:8:24 |
| 303 | I-1 + I-2 + I-3 | II | III-7 | IV-1 + IV-3 | V-5 | VI-1 | 27:24:5:11:8:25 |
| 304 | I-1 + I-2 + I-3 | II | III-8 | IV-1 + IV-3 | V-5 | VI-1 | 26:29:3:8:10:24 |
| 305 | I-1 | II | III-1 | IV-1 | V-6 | VI-16 | 30:25:7:6:8:24 |
| 306 | I-2 | II | III-1 | IV-1 | V-6 | VI-16 | 28:21:9:9:7:24 |
| 307 | I-1 | II | III-1 | IV-1 + IV-3 | V-6 | VI-16 | 25:25:4:14:8:24 |
| 308 | I-1 | II | III-7 | IV-1 + IV-3 | V-6 | VI-16 | 27:24:5:11:8:25 |
| 309 | I-1 | II | III-8 | IV-1 + IV-3 | V-6 | VI-16 | 26:29:3:8:10:24 |
| 310 | I-2 | II | III-1 | IV-1 + IV-3 | V-6 | VI-16 | 28:21:9:9:7:24 |
| 311 | I-2 | II | III-7 | IV-1 + IV-3 | V-6 | VI-16 | 30:25:7:6:8:24 |
| 312 | I-2 | II | III-8 | IV-1 + IV-3 | V-6 | VI-16 | 32:24:6:7:6:25 |
| 313 | I-1 + I-2 | II | III-1 | IV-1 | V-6 | VI-16 | 31:22:8:8:7:24 |
| 314 | I-1 | II | III-1 + III-2 | IV-1 | V-6 | VI-16 | 30:24:7:7:7:25 |
| 315 | I-2 | II | III-1 + III-2 | IV-1 | V-6 | VI-16 | 25:25:4:14:8:24 |
| 316 | I-1 | II | III-1 + III-2 | IV-1 + IV-3 | V-6 | VI-16 | 27:24:5:11:8:25 |
| 317 | I-2 | II | III-1 + III-2 | IV-1 + IV-3 | V-6 | VI-16 | 26:29:3:8:10:24 |
| 318 | I-1 + I-2 | II | III-1 + III-2 | IV-1 | V-6 | VI-16 | 28:21:9:9:7:24 |
| 319 | I-1 + I-2 | II | III-1 + III-2 | IV-1 + IV-3 | V-6 | VI-16 | 30:25:7:6:8:24 |
| 320 | I-1 + I-2 | II | III-7 | IV-1 + IV-3 | V-6 | VI-16 | 32:24:6:7:6:25 |
| 321 | I-1 + I-2 | II | III-8 | IV-1 + IV-3 | V-6 | VI-16 | 31:22:8:8:7:24 |
| 322 | I-1 + I-2 + I-3 | II | III-1 + III-2 | IV-1 | V-6 | VI-16 | 30:24:7:7:7:25 |
| 323 | I-1 + I-2 + I-3 | II | III-1 + III-2 | IV-1 + IV-3 | V-6 | VI-16 | 25:25:4:14:8:24 |
| 324 | I-1 | II | III-1 + III-2 + III-3 | IV-1 | V-6 | VI-16 | 27:24:5:11:8:25 |
| 325 | I-2 | II | III-1 + III-2 + III-3 | IV-1 | V-6 | VI-16 | 26:29:3:8:10:24 |
| 326 | I-1 | II | III-1 + III-2 + III-3 | IV-1 + IV-3 | V-6 | VI-16 | 32:24:6:7:6:25 |
| 327 | I-2 | II | III-1 + III-2 + III-3 | IV-1 + IV-3 | V-6 | VI-16 | 28:21:9:9:7:24 |
| 328 | I-1 + I-2 | II | III-1 + III-2 + III-3 | IV-1 | V-6 | VI-16 | 30:25:7:6:8:24 |
| 329 | I-1 + I-2 | II | III-1 + III-2 + III-3 | IV-1 + IV-3 | V-6 | VI-16 | 32:24:6:7:6:25 |
| 330 | I-1 + I-2 + I-3 | II | III-1 + III-2 + III-3 | IV-1 | V-6 | VI-16 | 27:24:5:11:8:25 |
| 331 | I-1 + I-2 + I-3 | II | III-1 + III-2 + III-3 | IV-1 + IV-3 | V-6 | VI-16 | 26:29:3:8:10:24 |
| 332 | I-1 + I-2 + I-3 | II | III-7 | IV-1 + IV-3 | V-6 | VI-16 | 28:21:9:9:7:24 |
| 333 | I-1 + I-2 + I-3 | II | III-8 | IV-1 + IV-3 | V-6 | VI-16 | 30:25:7:6:8:24 |
| 334 | I-1 | II | III-1 | IV-1 | V-13 | VI-1 | 32:24:6:7:6:25 |
| 335 | I-2 | II | III-1 | IV-1 | V-13 | VI-1 | 31:22:8:8:7:24 |
| 336 | I-1 | II | III-1 | IV-1 + IV-3 | V-13 | VI-1 | 30:24:7:7:7:25 |
| 337 | I-1 | II | III-7 | IV-1 + IV-3 | V-13 | VI-1 | 25:25:4:14:8:24 |
| 338 | I-1 | II | III-8 | IV-1 + IV-3 | V-13 | VI-1 | 27:24:5:11:8:25 |
| 339 | I-2 | II | III-1 | IV-1 + IV-3 | V-13 | VI-1 | 26:29:3:8:10:24 |
| 340 | I-2 | II | III-7 | IV-1 + IV-3 | V-13 | VI-1 | 28:21:9:9:7:24 |
| 341 | I-2 | II | III-8 | IV-1 + IV-3 | V-13 | VI-1 | 30:25:7:6:8:24 |
| 342 | I-1 + I-2 | II | III-1 | IV-1 | V-13 | VI-1 | 32:24:6:7:6:25 |
| 343 | I-1 | II | III-1 + III-2 | IV-1 | V-13 | VI-1 | 31:22:8:8:7:24 |
| 344 | I-2 | II | III-1 + III-2 | IV-1 | V-13 | VI-1 | 30:24:7:7:7:25 |
| 345 | I-1 | II | III-1 + III-2 | IV-1 + IV-3 | V-13 | VI-1 | 25:25:4:14:8:24 |
| 346 | I-2 | II | III-1 + III-2 | IV-1 + IV-3 | V-13 | VI-1 | 27:24:5:11:8:25 |
| 347 | I-1 + I-2 | II | III-1 + III-2 | IV-1 | V-13 | VI-1 | 26:29:3:8:10:24 |
| 348 | I-1 + I-2 | II | III-1 + III-2 | IV-1 + IV-3 | V-13 | VI-1 | 28:21:9:9:7:24 |
| 349 | I-1 + I-2 | II | III-7 | IV-1 + IV-3 | V-13 | VI-1 | 30:25:7:6:8:24 |
| 350 | I-1 + I-2 | II | III-8 | IV-1 + IV-3 | V-13 | VI-1 | 32:24:6:7:6:25 |
| 351 | I-1 + I-2 + I-3 | II | III-1 + III-2 | IV-1 | V-13 | VI-1 | 31:22:8:8:7:24 |
| 352 | I-1 + I-2 + I-3 | II | III-1 + III-2 | IV-1 + IV-3 | V-13 | VI-1 | 30:25:7:6:8:24 |
| 353 | I-1 | II | III-1 + III-2 + III-3 | IV-1 | V-13 | VI-1 | 25:25:4:14:8:24 |
| 354 | I-2 | II | III-1 + III-2 + III-3 | IV-1 | V-13 | VI-1 | 27:24:5:11:8:25 |
| 355 | I-1 | II | III-1 + III-2 + III-3 | IV-1 + IV-3 | V-13 | VI-1 | 26:29:3:8:10:24 |
| 356 | I-2 | II | III-1 + III-2 + III-3 | IV-1 + IV-3 | V-13 | VI-1 | 32:24:6:7:6:25 |
| 357 | I-1 + I-2 | II | III-1 + III-2 + III-3 | IV-1 | V-13 | VI-1 | 28:21:9:9:7:24 |
| 358 | I-1 + I-2 | II | III-1 + III-2 + III-3 | IV-1 + IV-3 | V-13 | VI-1 | 30:25:7:6:8:24 |
| 359 | I-1 + I-2 + I-3 | II | III-1 + III-2 + III-3 | IV-1 | V-13 | VI-1 | 32:24:6:13:0:25 |
| 360 | I-1 + I-2 + I-3 | II | III-1 + III-2 + III-3 | IV-1 + IV-3 | V-13 | VI-1 | 27:24:5:11:8:25 |
| 361 | I-1 | II | — | — | V-5 | VI-1 | 31:34:0:0:15:20 |
| 362 | I-2 | II | — | — | V-5 | VI-1 | 30:35:0:0:16:19 |

TABLE 8-continued

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 363 | I-1 + I-2 | II | — | — | V-5 | VI-1 | 29:33:0:0:14:24 |
| 364 | I-1 + I-2 + I-3 | II | — | — | V-5 | VI-1 | 28:32:0:0:18:22 |
| 365 | I-1 | II | — | — | V-5 | VI-16 | 32:30:0:0:17:21 |
| 366 | I-2 | II | — | — | V-5 | VI-16 | 29:35:0:0:16:20 |
| 367 | I-1 + I-2 | II | — | — | V-5 | VI-16 | 34:34:0:0:13:19 |
| 368 | I-1 + I-2 + I-3 | II | — | — | V-5 | VI-16 | 27:34:0:0:17:22 |
| 369 | I-2 | II | III-1 | — | V-5 | VI-1 | 30:24:7:0:14:25 |
| 370 | I-2 | II | III-7 | — | V-5 | VI-1 | 27:25:6:0:18:24 |
| 371 | I-2 | II | III-8 | — | V-5 | VI-1 | 26:23:8:0:19:24 |
| 372 | I-1 + I-2 | II | III-1 | — | V-5 | VI-1 | 27:24:7:0:17:25 |
| 373 | I-1 + I-2 | II | III-7 | — | V-5 | VI-1 | 25:23:8:0:20:24 |
| 374 | I-1 + I-2 | II | III-8 | — | V-5 | VI-1 | 28:20:8:0:19:25 |
| 375 | I-1 | II | III-1 + III-2 | — | V-5 | VI-1 | 27:22:7:0:19:25 |
| 376 | I-2 | II | III-1 + III-2 | — | V-5 | VI-1 | 26:21:10:0:20:23 |
| 377 | I-1 | II | III-1 + III-2 | — | V-5 | VI-1 | 30:25:5:0:15:25 |
| 378 | I-2 | II | III-1 + III-2 | — | V-5 | VI-1 | 29:24:7:0:16:24 |
| 379 | I-1 + I-2 | II | III-1 + III-2 | — | V-5 | VI-1 | 28:23:6:0:18:25 |
| 380 | I-1 + I-2 | II | III-1 + III-2 | — | V-5 | VI-1 | 30:20:8:0:17:25 |
| 381 | I-1 + I-2 + I-3 | II | III-1 + III-2 | — | V-5 | VI-1 | 27:28:5:0:15:25 |
| 382 | I-1 + I-2 + I-3 | II | III-1 + III-2 | — | V-5 | VI-1 | 31:26:4:0:15:25 |
| 383 | I-1 + I-2 + I-3 | II | III-7 | — | V-5 | VI-1 | 29:25:6:0:16:24 |
| 384 | I-1 + I-2 + I-3 | II | III-8 | — | V-5 | VI-1 | 30:25:5:0:15:25 |
| 385 | I-1 | II | III-1 + III-2 + III-3 | — | V-5 | VI-1 | 29:24:7:0:16:24 |
| 386 | I-2 | II | III-1 + III-2 + III-3 | — | V-5 | VI-1 | 28:23:6:0:18:25 |
| 387 | I-1 | II | III-1 + III-2 + III-3 | — | V-5 | VI-1 | 30:20:8:0:17:25 |
| 388 | I-2 | II | III-1 + III-2 + III-3 | — | V-5 | VI-1 | 27:28:5:0:15:25 |
| 389 | I-1 + I-2 | II | III-1 + III-2 + III-3 | — | V-5 | VI-1 | 31:26:4:0:15:25 |
| 390 | I-1 + I-2 | II | III-1 + III-2 + III-3 | — | V-5 | VI-1 | 29:25:6:0:16:24 |
| 391 | I-1 + I-2 + I-3 | II | III-1 + III-2 + III-3 | — | V-5 | VI-1 | 27:24:7:0:17:25 |
| 392 | I-1 + I-2 + I-3 | II | III-1 + III-2 + III-3 | — | V-5 | VI-1 | 28:22:9:0:16:25 |
| 393 | I-2 | II | III-1 | — | V-5 | VI-16 | 32:24:6:0:13:25 |
| 394 | I-1 + I-2 | II | III-1 | — | V-5 | VI-16 | 31:22:8:0:15:24 |
| 395 | I-1 + I-2 | II | III-7 | — | V-5 | VI-16 | 30:24:7:0:14:25 |
| 396 | I-1 + I-2 | II | III-8 | — | V-5 | VI-16 | 27:25:6:0:18:24 |
| 397 | I-1 | II | III-1 + III-2 | — | V-5 | VI-16 | 26:23:8:0:19:24 |
| 398 | I-2 | II | III-1 + III-2 | — | V-5 | VI-16 | 27:24:7:0:17:25 |
| 399 | I-1 | II | III-1 + III-2 | — | V-5 | VI-16 | 25:23:8:0:20:24 |
| 400 | I-2 | II | III-1 + III-2 | — | V-5 | VI-16 | 29:26:5:0:16:24 |
| 401 | I-1 + I-2 | II | III-1 + III-2 | — | V-5 | VI-16 | 34:34:0:0:13:19 |
| 402 | I-1 + I-2 | II | III-1 + III-2 | — | V-5 | VI-16 | 27:34:0:0:17:22 |
| 403 | I-1 + I-2 + I-3 | II | III-1 + III-2 | — | V-5 | VI-16 | 30:24:7:0:14:25 |
| 404 | I-1 + I-2 + I-3 | II | III-1 + III-2 | — | V-5 | VI-16 | 27:25:6:0:18:24 |
| 405 | I-1 | II | III-1 + III-2 + III-3 | — | V-5 | VI-16 | 26:23:8:0:19:24 |
| 406 | I-2 | II | III-1 + III-2 + III-3 | — | V-5 | VI-16 | 27:24:7:0:17:25 |
| 407 | I-1 | II | III-1 + III-2 + III-3 | — | V-5 | VI-16 | 25:23:8:0:20:24 |
| 408 | I-2 | II | III-1 + III-2 + III-3 | — | V-5 | VI-16 | 28:20:8:0:19:25 |
| 409 | I-1 + I-2 | II | III-1 + III-2 + III-3 | — | V-5 | VI-16 | 27:22:7:0:19:25 |
| 410 | I-1 + I-2 | II | III-1 + III-2 + III-3 | — | V-5 | VI-16 | 26:21:10:0:20:23 |
| 411 | I-1 + I-2 + I-3 | II | III-1 + III-2 + III-3 | — | V-5 | VI-16 | 30:25:5:0:15:25 |
| 412 | I-1 + I-2 + I-3 | II | III-1 + III-2 + III-3 | — | V-5 | VI-16 | 29:24:7:0:16:24 |
| 413 | I-1 + I-2 + I-3 | II | III-7 | — | V-5 | VI-16 | 28:23:6:0:18:25 |
| 414 | I-1 + I-2 + I-3 | II | III-8 | — | V-5 | VI-16 | 30:20:8:0:17:25 |
| 415 | I-1 | II | III-1 | IV-1 | Va-1 | VI-1 | 28:25:4:14:5:24 |
| 416 | I-2 | II | III-1 | IV-1 | Va-1 | VI-1 | 29:24:5:11:6:25 |
| 417 | I-1 | II | III-1 | IV-1 + IV-3 | Va-1 | VI-1 | 30:29:3:8:6:24 |
| 418 | I-1 | II | III-7 | IV-1 + IV-3 | Va-1 | VI-1 | 28:21:9:9:7:24 |
| 419 | I-1 | II | III-8 | IV-1 + IV-3 | Va-1 | VI-1 | 30:25:7:6:8:24 |
| 420 | I-2 | II | III-1 | IV-1 + IV-3 | Va-1 | VI-1 | 32:24:6:9:4:25 |
| 421 | I-2 | II | III-7 | IV-1 + IV-3 | Va-1 | VI-1 | 31:22:8:12:3:24 |
| 422 | I-2 | II | III-8 | IV-1 + IV-3 | Va-1 | VI-1 | 30:24:7:10:4:25 |
| 423 | I-1 + I-2 | II | III-1 | IV-1 | Va-1 | VI-1 | 25:25:4:12:6:24 |
| 424 | I-1 + I-2 | II | III-7 | IV-1 | Va-1 | VI-1 | 27:24:5:13:6:25 |
| 425 | I-1 + I-2 | II | III-8 | IV-1 | Va-1 | VI-1 | 29:29:3:8:7:24 |
| 426 | I-1 | II | III-1 + III-2 | IV-1 | Va-1 | VI-1 | 28:21:9:9:7:24 |
| 427 | I-2 | II | III-1 + III-2 | IV-1 | Va-1 | VI-1 | 30:25:7:8:6:24 |
| 428 | I-1 | II | III-1 + III-2 | IV-1 + IV-3 | Va-1 | VI-1 | 32:24:6:9:4:25 |
| 429 | I-2 | II | III-1 + III-2 | IV-1 + IV-3 | Va-1 | VI-1 | 31:22:8:11:4:24 |
| 430 | I-1 + I-2 | II | III-1 + III-2 | IV-1 | Va-1 | VI-1 | 30:24:7:9:5:25 |
| 431 | I-1 + I-2 | II | III-1 + III-2 | IV-1 + IV-3 | Va-1 | VI-1 | 25:25:4:12:6:24 |
| 432 | I-1 + I-2 + I-3 | II | III-1 + III-2 | IV-1 | Va-1 | VI-1 | 27:24:5:14:5:25 |
| 433 | I-1 + I-2 + I-3 | II | III-1 + III-2 | IV-1 + IV-3 | Va-1 | VI-1 | 26:29:3:12:6:24 |
| 434 | I-1 + I-2 + I-3 | II | III-7 | IV-1 + IV-3 | Va-1 | VI-1 | 32:24:6:9:4:25 |
| 435 | I-1 + I-2 + I-3 | II | III-8 | IV-1 + IV-3 | Va-1 | VI-1 | 28:21:9:11:5:24 |
| 436 | I-1 | II | III-1 + III-2 + III-3 | IV-1 | Va-1 | VI-1 | 30:25:7:8:6:24 |
| 437 | I-2 | II | III-1 + III-2 + III-3 | IV-1 | Va-1 | VI-1 | 32:24:6:10:3:25 |
| 438 | I-1 | II | III-1 + III-2 + III-3 | IV-1 + IV-3 | Va-1 | VI-1 | 27:24:5:14:5:25 |
| 439 | I-2 | II | III-1 + III-2 + III-3 | IV-1 + IV-3 | Va-1 | VI-1 | 30:29:3:8:6:24 |

TABLE 8-continued

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 440 | I-1 + I-2 | II | III-1 + III-2 + III-3 | IV-1 | Va-1 | VI-1 | 31:23:9:9:4:24 |
| 441 | I-1 + I-2 | II | III-1 + III-2 + III-3 | IV-1 + IV-3 | Va-1 | VI-1 | 30:25:7:10:4:24 |
| 442 | I-1 + I-2 + I-3 | II | III-1 + III-2 + III-3 | IV-1 | Va-1 | VI-1 | 32:24:6:9:4:25 |
| 443 | I-1 + I-2 + I-3 | II | III-1 + III-2 + III-3 | IV-1 + IV-3 | Va-1 | VI-1 | 31:22:8:10:5:24 |
| 444 | I-1 | II | — | — | Va-1 | VI-1 | 35:33:0:0:7:25 |
| 445 | I-1 | II | — | — | Va-1 | VI-16 | 39:30:0:0:6:25 |
| 446 | I-2 | II | — | — | Va-1 | VI-1 | 37:31:0:0:7:25 |
| 447 | I-2 | II | — | — | Va-1 | VI-16 | 38:34:0:0:4:24 |
| 448 | I-1 + I-2 | II | — | — | Va-1 | VI-1 | 37:31:0:0:8:24 |
| 449 | I-1 + I-2 | II | — | — | Va-1 | VI-16 | 39:32:0:0:5:24 |
| 450 | I-1 + I-2 + I-3 | II | — | — | Va-1 | VI-1 | 36:32:0:0:8:25 |
| 451 | I-1 + I-2 + I-3 | II | — | — | Va-1 | VI-16 | 38:32:0:0:6:24 |
| 452 | I-1 | II | III-1 | — | Va-1 | VI-16 | 37:29:6:0:3:25 |
| 453 | I-2 | II | III-1 | — | Va-1 | VI-16 | 38:28:5:0:5:24 |
| 454 | I-1 | II | III-1 | — | Va-1 | VI-16 | 37:29:4:0:6:24 |
| 455 | I-1 | II | III-7 | — | Va-1 | VI-16 | 39:28:5:0:3:25 |
| 456 | I-1 | II | III-8 | — | Va-1 | VI-16 | 37:32:3:0:4:24 |
| 457 | I-2 | II | III-1 | — | Va-1 | VI-16 | 37:29:4:0:6:24 |
| 458 | I-2 | II | III-7 | — | Va-1 | VI-16 | 39:28:5:0:3:25 |
| 459 | I-2 | II | III-8 | — | Va-1 | VI-16 | 37:32:3:0:4:24 |
| 460 | I-1 + I-2 | II | III-1 | — | Va-1 | VI-16 | 37:29:6:0:3:25 |
| 461 | I-1 + I-2 | II | III-7 | — | Va-1 | VI-16 | 38:28:5:0:5:24 |
| 462 | I-1 + I-2 | II | III-8 | — | Va-1 | VI-16 | 37:32:3:0:4:24 |
| 463 | I-1 | II | III-1 + III-2 | — | Va-1 | VI-16 | 39:28:5:0:3:25 |
| 464 | I-2 | II | III-1 + III-2 | — | Va-1 | VI-16 | 37:29:4:0:6:24 |
| 465 | I-1 | II | III-1 + III-2 | — | Va-1 | VI-16 | 37:29:6:0:3:25 |
| 466 | I-2 | II | III-1 + III-2 | — | Va-1 | VI-16 | 37:29:4:0:6:24 |
| 467 | I-1 + I-2 | II | III-1 + III-2 | — | Va-1 | VI-16 | 38:28:5:0:5:24 |
| 468 | I-1 + I-2 | II | III-1 + III-2 | — | Va-1 | VI-16 | 39:28:5:0:3:25 |
| 469 | I-1 + I-2 + I-3 | II | III-1 + III-2 | — | Va-1 | VI-16 | 37:29:6:0:3:25 |
| 470 | I-1 + I-2 + I-3 | II | III-1 + III-2 | — | Va-1 | VI-16 | 38:28:5:0:5:24 |
| 471 | I-1 + I-2 + I-3 | II | III-7 | — | Va-1 | VI-16 | 37:29:4:0:6:24 |
| 472 | I-1 + I-2 + I-3 | II | III-8 | — | Va-1 | VI-16 | 38:28:5:0:5:24 |
| 473 | I-1 | II | III-1 + III-2 + III-3 | — | Va-1 | VI-16 | 37:29:6:0:3:25 |
| 474 | I-2 | II | III-1 + III-2 + III-3 | — | Va-1 | VI-16 | 39:28:5:0:3:25 |
| 475 | I-1 | II | III-1 + III-2 + III-3 | — | Va-1 | VI-16 | 38:28:5:0:5:24 |
| 476 | I-2 | II | III-1 + III-2 + III-3 | — | Va-1 | VI-16 | 37:29:4:0:6:24 |
| 477 | I-1 + I-2 | II | III-1 + III-2 + III-3 | — | Va-1 | VI-16 | 37:29:6:0:3:25 |
| 478 | I-1 + I-2 | II | III-1 + III-2 + III-3 | — | Va-1 | VI-16 | 39:28:5:0:3:25 |
| 479 | I-1 + I-2 + I-3 | II | III-1 + III-2 + III-3 | — | Va-1 | VI-16 | 37:32:3:0:4:24 |
| 480 | I-1 + I-2 + I-3 | II | III-1 + III-2 + III-3 | — | Va-1 | VI-16 | 37:29:4:0:6:24 |
| 481 | I-4 | II | III-1 + III-2 + III-3 | IV-1 | V-5 | VI-1 | 25:21:4:20:5:25 |
| 482 | I-5 | II | III-1 + III-2 + III-3 | IV-1 + IV-3 | — | VI-1 | 26:21:5:24:0:24 |
| 483 | I-6 | II | III-1 | IV-1 | — | VI-3 | 28:20:5:22:0:25 |
| 484 | I-7 | II | III-1 | IV-1 | — | VI-3 | 27:19:7:23:0:24 |
| 485 | I-8 | II | III-1 | IV-1 + IV-3 | V-6 | VI-3 | 29:20:4:18:5:24 |
| 486 | I-9 | II | III-7 | IV-1 + IV-3 | — | VI-3 | 27:19:7:23:0:24 |
| 487 | I-10 | II | III-8 | IV-1 + IV-3 | — | VI-3 | 28:20:5:22:0:25 |
| 488 | I-11 | II | III-1 | IV-1 | — | VI-3 | 29:20:4:23:0:24 |
| 489 | I-12 | II | III-7 | IV-1 + IV-3 | — | VI-3 | 26:21:5:24:0:24 |
| 490 | I-13 | II | III-8 | IV-1 + IV-3 | V-5 | VI-3 | 27:19:7:17:6:24 |
| 491 | I-14 | II | III-1 | IV-1 | — | VI-3 | 28:20:5:24:0:24 |
| 492 | I-15 | II | III-1 | IV-1 + IV-3 | — | VI-3 | 29:20:4:23:0:24 |
| 493 | I-16 | II | III-7 | IV-1 + IV-3 | — | VI-3 | 25:21:4:25:0:25 |
| 494 | I-17 | II | III-8 | IV-1 + IV-3 | — | VI-3 | 27:19:7:23:0:24 |
| 495 | I-18 | II | III-1 | IV-1 | — | VI-3 | 26:21:5:24:0:24 |
| 496 | I-19 | II | III-1 | IV-1 + IV-3 | V-6 | VI-3 | 29:20:4:18:5:24 |
| 497 | I-20 | II | III-7 | IV-1 + IV-3 | — | VI-3 | 28:20:5:24:0:25 |
| 498 | I-21 | II | III-8 | IV-1 + IV-3 | — | VI-3 | 29:20:4:23:0:24 |
| 499 | I-22 | II | III-1 | IV-1 | — | VI-3 | 26:21:5:24:0:24 |
| 500 | I-23 | II | III-1 + III-2 | IV-1 | V-5 | VI-3 | 27:19:7:17:6:24 |
| 501 | I-24 | II | III-1 + III-2 | IV-1 + IV-3 | — | VI-3 | 25:21:4:25:0:25 |
| 502 | I-25 | II | III-1 + III-2 | IV-1 + IV-3 | — | VI-3 | 26:21:5:24:0:24 |
| 503 | I-26 | II | III-1 + III-2 | IV-1 | — | VI-3 | 28:20:5:22:0:25 |
| 504 | I-27 | II | III-1 + III-2 | IV-1 + IV-3 | — | VI-3 | 29:20:4:23:0:24 |
| 505 | I-28 | II | III-1 + III-2 | IV-1 | — | VI-3 | 27:19:7:23:0:24 |
| 506 | I-29 | II | III-1 + III-2 | IV-1 + IV-3 | V-6 | VI-3 | 26:21:5:18:6:24 |
| 507 | I-30 | II | III-1 + III-2 + III-3 | IV-1 | — | VI-3 | 29:20:4:23:0:24 |
| 508 | I-31 | II | III-1 + III-2 + III-3 | IV-1 | — | VI-3 | 28:20:5:24:0:25 |
| 509 | I-32 | II | III-1 + III-2 + III-3 | IV-1 + IV-3 | — | VI-3 | 29:20:4:23:0:24 |
| 510 | I-33 | II | III-1 + III-2 + III-3 | IV-1 + IV-3 | — | VI-3 | 27:19:7:23:0:24 |
| 511 | I-34 | II | III-1 + III-2 + III-3 | IV-1 | — | VI-3 | 25:21:4:25:0:25 |
| 512 | I-35 | II | III-1 + III-2 + III-3 | IV-1 + IV-3 | — | VI-3 | 27:19:7:23:0:24 |
| 513 | I-36 | II | III-1 + III-2 + III-3 | IV-1 | — | VI-3 | 29:20:4:23:0:24 |
| 514 | I-37 | II | III-1 + III-2 + III-3 | IV-1 + IV-3 | V-6 | VI-3 | 26:21:5:18:6:24 |
| 515 | I-38 | II | III-1 | IV-1 | — | VI-3 | 25:21:4:25:0:25 |
| 516 | I-39 | II | III-1 | IV-1 | — | VI-3 | 27:19:7:23:0:24 |

TABLE 8-continued

| Mixture | Dye (I) | Dye (II) | Dye (III) | Dye (IV) | Dye (V) | Dye (VI) | Ratio (I):(II):(III):(IV):(V):(VI) |
|---|---|---|---|---|---|---|---|
| 517 | I-40 | II | III-1 | IV-1 + IV-3 | — | VI-3 | 28:20:5:24:0:25 |
| 518 | I-41 | II | III-1 | IV-1 + IV-3 | — | VI-3 | 26:21:5:24:0:24 |
| 519 | I-42 | II | III-1 | IV-1 | — | VI-3 | 29:20:4:23:0:24 |
| 520 | I-43 | II | III-1 | IV-1 + IV-3 | V-5 | VI-3 | 26:21:5:18:6:24 |
| 521 | I-44 | II | III-1 | IV-1 | — | VI-3 | 27:19:7:23:0:24 |
| 522 | I-45 | II | III-1 | IV-1 + IV-3 | — | VI-3 | 25:21:4:25:0:25 |
| 523 | I-46 | II | III-1 | IV-1 | — | VI-16 | 26:21:5:24:0:24 |
| 524 | I-47 | II | III-1 | IV-1 | — | VI-16 | 28:20:5:24:0:25 |
| 525 | I-48 | II | III-1 | IV-1 + IV-3 | — | VI-16 | 27:19:7:23:0:24 |
| 526 | I-49 | II | III-7 | IV-1 + IV-3 | — | VI-16 | 29:20:4:23:0:24 |
| 527 | I-50 | II | III-8 | IV-1 + IV-3 | V-6 | VI-16 | 26:21:5:18:6:24 |
| 528 | I-51 | II | III-1 | IV-1 + IV-3 | — | VI-16 | 28:20:5:24:0:25 |
| 529 | I-52 | II | III-7 | IV-1 + IV-3 | — | VI-16 | 25:21:4:25:0:25 |
| 530 | I-53 | II | III-8 | IV-1 + IV-3 | — | VI-16 | 27:19:7:23:0:24 |
| 531 | I-54 | II | III-1 | IV-1 | — | VI-16 | 26:21:5:24:0:24 |
| 532 | I-55 | II | III-1 | IV-1 + IV-3 | V-5 | VI-16 | 28:20:5:16:6:25 |
| 533 | I-56 | II | III-7 | IV-1 + IV-3 | — | VI-16 | 29:20:4:23:0:24 |
| 534 | I-57 | II | III-8 | IV-1 + IV-3 | — | VI-16 | 27:19:7:23:0:24 |
| 535 | I-58 | II | III-1 + III-2 | IV-1 | — | VI-16 | 28:20:5:24:0:25 |
| 536 | I-59 | II | III-1 + III-2 | IV-1 | — | VI-16 | 26:21:5:24:0:24 |
| 537 | I-60 | II | III-1 + III-2 | IV-1 + IV-3 | V-5 | VI-16 | 25:21:4:20:5:25 |
| 538 | I-1 | II | III-1 + III-2 + III-3 | IVa | V-5 | VI-1 | 27:19:7:17:6:24 |
| 539 | I-2 | II | III-1 | IVb | V-6 | VI-3 | 25:21:4:20:5:25 |
| 540 | I-1 + I-2 | II | III-1 + III-2 | IVc | V-13 | VI-16 | 26:21:5:18:6:24 |
| 541 | I-1 | II | III-8 | IVa | V-5 | VI-3 | 28:20:5:16:6:25 |
| 542 | I-2 | II | III-1 + III-2 + III-3 | IVc | V-13 | VI-1 | 29:20:4:18:5:24 |
| 543 | I-1 + I-2 | II | III-7 | IVb | V-6 | VI-16 | 26:21:5:18:6:24 |
| 544 | I-1 | II | III-1 | IVc | V-13 | VI-1 | 27:19:7:17:6:24 |
| 546 | I-2 | II | III-8 | IVa | V-5 | VI-3 | 25:21:4:20:5:25 |
| 547 | I-1 + I-2 | II | III-1 + III-2 + III-3 | IVb | V-6 | VI-16 | 27:19:7:17:6:24 |
| 548 | I-1 | II | III-1 | IVc | V-5 | VI-3 | 25:21:4:20:5:25 |
| 549 | I-2 | II | III-1 + III-2 | IVa | V-13 | VI-1 | 26:21:5:18:6:24 |
| 550 | I-1 + I-2 | II | III-7 | IVb | Va-1 | VI-3 | 28:20:5:16:6:25 |
| 551 | I-1 | II | III-1 + III-2 + III-3 | IVa | Va-1 | VI-16 | 29:20:4:18:5:24 |
| 552 | I-2 | II | III-1 | IVc | V-5 | VI-3 | 27:19:7:17:6:24 |
| 553 | I-1 + I-2 | II | III-1 + III-2 | IVb | V-13 | VI-1 | 25:21:4:20:5:25 |
| 554 | I-1 | II | III-8 | IVc | V-6 | VI-16 | 26:21:5:18:6:24 |
| 555 | I-2 | II | III-1 + III-2 + III-3 | IVa | V-13 | VI-1 | 28:20:5:16:6:25 |
| 556 | I-1 + I-2 | II | III-7 | IVb | V-5 | VI-1 | 29:20:4:18:5:24 |
| 557 | I-1 | II | III-1 | IVb | — | VI-16 | 27:28:5:15:0:25 |
| 558 | I-2 | II | III-1 + III-2 | IVc | — | VI-3 | 31:26:4:15:0:25 |
| 559 | I-1 + I-2 | II | III-1 + III-2 + III-3 | IVa | — | VI-1 | 29:25:6:16:0:24 |
| 560 | I-1 | II | III-8 | IVc | — | VI-3 | 27:24:7:17:0:25 |
| 561 | I-2 | II | III-7 | IVb | — | VI-16 | 28:22:9:16:0:25 |
| 562 | I-1 + I-2 | II | III-1 | IVc | — | VI-3 | 32:24:6:13:0:25 |
| 563 | I-1 | II | III-1 + III-2 | IVa | — | VI-16 | 31:22:8:15:0:24 |
| 564 | I-2 | II | III-8 | IVc | — | VI-3 | 30:24:7:14:0:25 |
| 565 | I-1 + I-2 | II | III-1 + III-2 + III-3 | IVb | — | VI-1 | 27:25:6:18:0:24 |
| 566 | I-1 | II | — | — | — | VI-1 | 35:40:0:0:0:25 |
| 567 | I-2 | II | — | — | — | VI-3 | 36:39:0:0:0:25 |
| 568 | I-1 + I-2 | II | — | — | — | VI-16 | 34:41:0:0:0:25 |

If Dye (I) in Table 8 is a two component mixture as represented for example by structures I-1 and I-2 then the preferred ratios are 40:60 to 60:40 of I-1 to I-2 and more especially preferred would be a 50:50 ratio of I-1 to I-2. For a three component mixture as represented for example by I-1 and I-2 and I-3 then the preferred ratios would be 40:40:20 of I-1 to I-2 to I-3 and more especially preferred would be a 45:45:10 ratio of I-1 to I-2 to I-3.

If Dye (III) in Table 8 is a two component mixture as represented for example by structures III-1 and III-2 then the preferred ratios are 20:80 to 80:20 for III-1 to III-2 and more especially preferred ratios would be 40:60 to 60:40 of III-1 to III-2. For a three component mixture as represented for example by III-1 and III-2 and III-3 then the preferred ratio would be 5%-30% of III-1 to 35%-75% of III-2 and 20%-40% of III-3 and more especially preferred ratios would be 10%-20% of III-1 to 45%-65% of III-2 and 25%-35% of III-3.

If dye (IV) in Table 8 is a two component mixture as represented for example by structures IV-1 and IV-3 then the preferred ratios are 40:60 to 60:40 of IV-1 to IV-3 and more especially preferred would be a 50:50 ratio of IV-1 to IV-3. If dye (IV) is a two component mixture as represented by structures IVb then the preferred ratios are 40-60 and more especially preferred would be 45-55 ratio of the structures represented by IVb. For IVc the preferred ratio of H to $CH_3$ is 30-70 to 70-30 and much preferred would be 40-60 to 60-40.

Mixtures embodying the invention can be prepared, for example, by mixing the dye components in the required amounts. Suitable mixing methods include Co-crystallisation Typically, the dyes are dissolved in a hot solvent, for example, by placing the dyes in a suitable solvent and heating up to the reflux temperature of the solvent until the dyes are dissolved, thereafter filtering to provide a solution, and then allowing the solution to cool and crystals to form. The resultant mixture may then undergo further processing, such as milling and spray drying. Examples of suitable solvents for this process are organic solvents such as aromatic hydrocarbons, chlorinated hydrocarbons, aliphatic hydrocarbons, alicyclic hydrocarbons, alcohols, amides, sulphoxides, esters, ketones and ethers. Specific examples of organic solvents are toluene, ethyl cellosolve, acetone, chlorobenzene, pyridine, dimethyl formamide, dimethylsulphoxide, ethyl acetate, benzene, tetrahydrofuran and cyclohexane. Co-crystallisation is generally unsuitable for mixtures containing more than two components.

Co-milling

The dyes are mixed and then milled together to give an intimate blend which is then spray dried to give a solid mixture; or Co-drying Each dye is milled separately and then mixed in the required ratio before spray drying.

Dry-Blending

Each dye is spray dried separately and then mixed in the required ratio by a dry blending process.

Mixtures embodying the invention provide especially useful disperse dyes valuable for colouring synthetic textile materials and fibre blends thereof by exhaust dyeing, padding or printing, and may be formed into dispersions for this purpose. They may also be used in, for example, ink jet printing of textiles and non-textiles, dye diffusion, thermal transfer printing and in the colouration of plastics.

A particular aspect of the invention provides a composition comprising a mixture of dyestuffs of the general formula (I) with dyestuffs of the specific formula (III), and dyestuffs of general formula (IV) and (VI) and optionally dyestuffs of the general formula (III) and general formula (V), and additionally, at least one further ingredient conventionally used in colouring applications such as a dispersing agent and optionally a surfactant or wetting agent. The composition typically comprises from 1% to 65%, preferably 10 to 60%, more preferably 20 to 55%, of the total dye mixture in a solid medium.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-foamers such as mineral oil or nonanol, organic liquids and buffers. Dispersing agents may be present at from 10% to 200% on the weight of the dye mixtures. Wetting agents may be used at from 0% to 20% on the weight of the dye mixtures.

The compositions may be prepared by bead milling the dye mixture with glass beads or sand in an aqueous medium. The compositions may have further additions of dispersing agents, fillers and other surfactants and may be dried, by a technique such as spray drying, to give a solid composition comprising from 5% to 65% of dyestuff.

The resultant mixtures, are used to colour polyester (especially microfibre) and its blends with cellulose, elastane, nylon (conjugate microfibre) and wool in deep black shades with excellent levels of wet fastness According to another aspect, the invention provides a process for colouring a synthetic textile material or fibre blend thereof which comprises applying to the synthetic textile material or fibre blend the dyestuff mixture according to the invention.

The synthetic textile material may be selected from aromatic polyester, especially polyethylene terephthalate and microfibre constructions thereof (including both sea island and conjugate microfibres, polyamide, especially polyhexamethylene adipamide, secondary cellulose acetate, cellulose triacetate, polyurethanes and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, polyester-wool, polyester/polyurethane and polyester/polyamide in the form of a conjugate microfibre. The textile materials or blends thereof may be in the form of filaments, loose fibres, yarn or woven or knitted fabrics.

The inventive dyestuff mixtures may be applied to the synthetic textile materials or fibre blends by processes which are conventionally employed in applying disperse dyes to such materials and fibre blends.

Suitable process conditions may be selected from the following (i) exhaust dyeing at a pH of from 4 to 6.5, at a temperature of from 125° C. to 140° C. for from 10 to 120 minutes and under a pressure of from 1 to 2 bar, a sequestrant optionally being added;

(ii) continuous dyeing at a pH of from 4 to 6.5, at a temperature of from 190° C. to 225° C. for from 15 seconds to 5 minutes, a migration inhibitor optionally being added;

(iii) direct printing at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;

(iv) discharge printing (by padding the dye on to the textile material, drying and overprinting) at a pH of from 4 to 6.5, migration inhibitors and thickeners optionally being added;

(v) carrier dyeing at a pH of from 4 to 6.5, at a temperature of from 95° C. to 100° C. using a carrier such as methylnaphthalene, diphenylamine or 2-phenylphenol, sequestrants optionally being added; and (vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants optionally being added In all the above processes, the dye mixture is applied as a dispersion comprising from 0.001% to 20%, preferably from 0.005 to 16%, of the dye mixture in an aqueous medium.

In addition to the above-mentioned application processes, the dye mixtures may be applied to synthetic textile materials and fibre blends by ink-jet printing. For ink-jet applications, the application medium may comprise water, dispersing agents, biocides, and a water-soluble organic solvent, preferably in a weight ratio of 1:99 to 99:1, more preferably 1:95 to 50:50 and especially in the range 10:90 to 40:60. The water-soluble organic solvent preferably comprises a $C_{1-4}$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

In contrast to conventional textile printing, in inkjet printing the auxiliaries have to be applied to the textile substrate in a separate pretreatment step. The pretreatment of the textile substrate is effected with thickeners to prevent flowing of the motives when the printing ink is applied, for example sodium alginates, modified polyacrylates or highly etherified galactomannanes.

These pretreatment reagents are uniformly applied to the textile substrate in a defined amount using suitable applicators, for example using a 2- or 3-roll pad, contact less spraying technologies, by means of foam application or using appropriately adapted inkjet technologies, and subsequently dried.

After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

The dye mixtures may also be applied to textile materials using supercritical carbon dioxide, in which case the dye formulating agents may optionally be omitted.

Embodiments of the present invention will now be described in more detail with reference to the following examples, in which parts are by weight unless otherwise stated.

EXAMPLE 1

A 50:50 mixture of dyestuff I-1 and dyestuff I-2 can be prepared by reacting equimolecular proportions of 2-methyl aniline and 2-ethyl aniline with a 7-Phenyl-7H-Benzo[1,2-b; 4,5-b']difuran-2,3,6-trione intermediate. The isolated colour is an intimate mixture of the two components in approximately equal proportions and this can be verified by analysis. 57.6 parts of this mixture can then be mixed with 23.2 parts of a dye of dyestuff IV (comprising of a 50:50 mixture of IV-1 and IV-3), 27.6 parts of a dye of dyestuff VI-16 and 74 parts of a dye of dyestuff II. When milled as a 40% aqueous slurry with 100 parts of a high temperature stable dispersing agent until the dye particle size (mean diameter) was in the range 0.1-5 microns.

This dispersion was standardised to a solid brand containing 40% of the mixture and 60% dispersing agent, by the addition of 163 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.25 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester micro fibre, where proportionately more dye has to be applied to obtain the same visual yield compared with conventional polyester.

EXAMPLE 2

A 50:50 mixture of dyestuff I-1 and dyestuff I-2 can be prepared by reacting equimolecular proportions of 2-methyl aniline and 2-ethyl aniline with a 7-Phenyl-7H-Benzo[1,2-b; 4,5-b']difuran-2,3,6-trione intermediate. The isolated colour is an intimate mixture of the two components in approximately equal proportions and this can be verified by analysis. 60.8 parts of this mixture can then be mixed with 24.3 parts of a dye of dyestuff IV (comprising of a 50:50 mixture of IV-1 and IV-3), 26.4 parts of dyestuff VI-16, 33.3 parts of a dye of dyestuff II and 15.8 parts of a dye of dyestuff III-1. When milled as a 40% aqueous slurry with 90 parts of a high temperature stable dispersing agent until the dye particle size (mean diameter) was in the range 0.1-5 microns.

This dispersion was standardised to a solid brand containing 36% of the mixture and 64% dispersing agent, by the addition of 199.4 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.5 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester microfibre, where proportionately more dye has to be applied to obtain the same visual yield compared with conventional polyester.

EXAMPLE 3

A 50:50 mixture of dyestuff I-1 and dyestuff I-2 can be prepared by reacting equimolecular proportions of 2-methyl aniline and 2-ethyl aniline with a 7-Phenyl-7H-Benzo[1,2-b; 4,5-b']difuran-2,3,6-trione intermediate. The isolated colour is an intimate mixture of the two components in approximately equal proportions and this can be verified by analysis. 60.8 parts of this mixture can then be mixed with 24.3 parts of a dye of dyestuff IV (comprising of a 50:50 mixture of IV-1 and IV-3), 26.4 parts of dyestuff VI-16, 33.3 parts of a dye of dyestuff II and a further mixture of 4.3 parts of dyestuff IIIA, 14.7 parts of dyestuff III-2 and 8.3 parts of dyestuff III-3. When milled as a 40% aqueous slurry with 90 parts of a high temperature stable dispersing agent until the dye particle size (mean diameter) was in the range 0.1-5 microns.

This dispersion was standardised to a solid brand containing 31% of the mixture and 69% dispersing agent, by the addition of 217 parts of 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon (especially conjugate microfibre) and polyester/wool blends and can also be used for continuous dyeing and direct printing.

A dye bath for the exhaust dyeing of polyester in piece form was prepared by adding 11.5 ml of an aqueous dispersion of the solid brand (2 g dye in 100 ml water at 40-50° C.)

to 57.5 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester microfibre, where proportionately more dye has to be applied to obtain the same visual yield compared with conventional polyester.

EXAMPLE 4

A 50:50 mixture of dyestuff I-1 and dyestuff I-2 can be prepared by reacting equimolecular proportions of 2-methyl aniline and 2-ethyl aniline with a 7-Phenyl-7H-Benzo[1,2-b; 4,5-b']difuran-2,3,6-trione intermediate. The isolated colour is an intimate mixture of the two components in approximately equal proportions and this can be verified by analysis. 55.6 parts of this mixture can then be mixed with 14.3 parts of a dye of dyestuff V-1, 29.2 parts of dyestuff VI-1, 52 parts of a dye of dyestuff II. When milled as a 40% aqueous slurry with 90 parts of a high temperature stable dispersing agent until the dye particle size (mean diameter) was in the range 0.1-5 microns.

This dispersion was standardised to a solid brand containing 35% of the mixture and 65% dispersing agent, 190 parts of 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon (especially conjugate microfibre) and polyester/wool blends and can also be used for continuous dyeing and direct printing.

A dye bath for the exhaust dyeing of polyester in piece form was prepared by adding 10.8 mls of an aqueous dispersion of the solid brand (2 g dye in 100 ml water at 40-50° C.) to 57.5 ml of deionised water and 1.2 ml of buffer solution. To this dyebath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester microfibre, where proportionately more dye has to be applied to obtain the same visual yield compared with conventional polyester.

EXAMPLE 5

A mixture of 30.4 parts of dyestuff I-1 can then be mixed with 12.15 parts of a dye of dyestuff IV (comprising of a 50:50 mixture of IV-1 and IV-3), 13.2 parts of dyestuff VI-16, 16.15 parts of a dye of dyestuff II and 7.9 parts of a dye of dyestuff III-1 When milled as a 40% aqueous slurry with 45 parts of a high temperature stable dispersing agent until the dye particle size (mean diameter) was in the range 0.1-5 microns.

This dispersion was standardised to a solid brand containing 36% of the mixture and 64% dispersing agent, by the addition of 99.7 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.5 ml of an aqueous dispersion of the solid brand (2 g dye in 100 ml water at 40-50° C.) to 57.5 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester microfibre, where proportionately more dye has to be applied to obtain the same visual yield compared with conventional polyester.

EXAMPLE 6

A 3 component mixture of dyestuff I-1, dyestuff I-2 and dyestuff I-3 can be prepared by reacting of 2-methyl aniline, 2-ethyl aniline and 2:6 dimethyl aniline in the molecular proportions of 45:45:10 with a 7-Phenyl-7H-Benzo[1,2-b;4, 5-b']difuran-2,3,6-trione intermediate.

The isolated colour is an intimate mixture of the three components in approximately in the ratio indicated above and this can be verified by analysis. 28.8 parts of this 3 component mixture can then be mixed with 11.6 parts of a dye of dyestuff IV (comprising of a 50:50 mixture of IV-1 and IV-3), 13.8 parts of a dye of dyestuff VI-16 and 37 parts of a dye of dyestuff II. When milled as a 40% aqueous slurry with 50 parts of a high temperature stable dispersing agent until the dye particle size (mean diameter) was in the range 0.1-5 microns.

This dispersion was standardised to a solid brand containing 40% of the mixture and 60% dispersing agent, by the addition of 81.5 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.25 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness An interesting feature of the mixture is its excellent build-up performance on polyester and especially polyester micro fibre, where proportionately more dye has to be applied to obtain the same visual yield compared with conventional polyester.

EXAMPLE 7

A 50:50 mixture of dyestuff I-1 and dyestuff I-2 can be prepared by reacting equimolecular proportions of 2-methyl aniline and 2-ethyl aniline with a 7-Phenyl-7H-Benzo[1,2-b; 4,5-b']difuran-2,3,6-trione intermediate. The isolated colour is an intimate mixture of the two components in approximately equal proportions and this can be verified by analysis. 28.8 parts of this mixture can then be mixed with 11.6 parts of a dye of dyestuff IV (comprising of a 50:50 mixture of IV-1 and IV-3), 13.8 parts of a dye of dyestuff VI-1 and 37 parts of a dye of dyestuff II. When milled as a 40% aqueous slurry with 100 parts of a high temperature stable dispersing agent until the dye particle size (mean diameter) was in the range 0.1-5 microns.

This dispersion was standardised to a solid brand containing 40% of the mixture and 60% dispersing agent, by the addition of 81.5 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.25 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester micro fibre, where proportionately more dye has to be applied to obtain the same visual yield compared with conventional polyester.

EXAMPLE 8

A 50:50 mixture of dyestuff I-1 and dyestuff I-2 can be prepared by reacting equimolecular proportions of 2-methyl aniline and 2-ethyl aniline with a 7-Phenyl-7H-Benzo[1,2-b; 4,5-b']difuran-2,3,6-trione intermediate. The isolated colour is an intimate mixture of the two components in approximately equal proportions and this can be verified by analysis. 30.4 parts of this mixture can then be mixed with 12.15 parts of a dye of dyestuff IV (comprising of a 50:50 mixture of IV-1 and IV-3), 13.2 parts of dyestuff VI-1, 16.65 parts of a dye of dyestuff II and 7.9 parts of a dye of dyestuff IIIA. When milled as a 40% aqueous slurry with 45 parts of a high temperature stable dispersing agent until the dye particle size (mean diameter) was in the range 0.1-5 microns.

This dispersion was standardised to a solid brand containing 36% of the mixture and 64% dispersing agent, by the addition of 99.5 parts of a 'filler'/'cutting' agent and drying to either a grain or powder form in a spray dryer. This product is especially suitable for the exhaust dyeing of polyester (including microfibre and weight reduced polyester), polyester/cellulose polyester/polyurethane, polyester/nylon especially conjugate microfibre) and polyester/wool blends and can also be used for continuous dyeing and direct printing.

A dye bath for the exhaust dyeing of polyester in piece form was prepared by adding 11.5 ml of an aqueous dispersion of the solid brand (2 g dye in 100 ml water at 40-50° C.) to 57 ml of de-ionised water and 1.2 ml of buffer solution. To this dye bath was added a 5 g piece of polyester and the whole was held for 45 minutes at 130° C. in a Werner Mathis Labomat high temperature dyeing machine. After rinsing with water and a reduction clearing treatment, the material was dyed a deep black shade with excellent wet fastness. An interesting feature of the mixture is its excellent build-up performance on polyester and especially polyester microfibre, where proportionately more dye has to be applied to obtain the same visual yield compared with conventional polyester.

EXAMPLE 9

A textile fabric of polyester was pretreated using a liquor 50 g/l of a 8% sodium alginate solution, 100 g/l of a 8-12% galactomannane solution and 5 g/l of sodium dihydrogen phosphate in water and then dried. The wet pickup is 70%.

The thus pretreated textile is printed with an aqueous ink containing
6% of the dyestuff mixture according to example 2
1.5% of dispersing agent Disperbyk 190
10% of 2-propanol
20% of polyethylene glycol 200
0.01% of biocide Mergal K9N
62.49% of water using a drop-on-demand (bubble jet) inkjet print head. The print is completely dried. It is fixed by means of saturated steam at 175° C. for 7 minutes.

The print is then rinsed warm, subjected to a fastness wash with hot water at 95° C., rinsed warm and then dried.

The result is black shade print having excellent use fastnesses.

The invention claimed is:

1. A dye mixture comprising one or more dyes of the herein below indicated and defined formula (I)

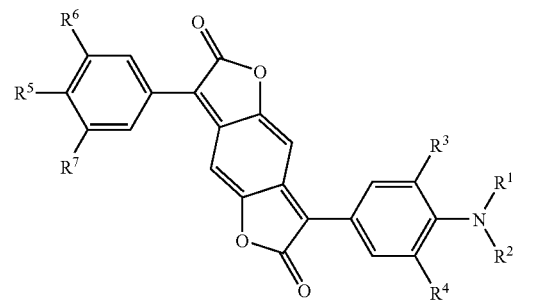

where
  $R^1$ and $R^2$ are independently hydrogen, optionally substituted alkyl, alkenyl, cycloalkyl, aryl or aralkyl, or $R^1$ and $R^2$ together with the N atom can form a heterocyclic 5, 6 or 7 membered ring,
  $R^3$ and $R^4$ are independently hydrogen, halogen, or an optionally substituted alkyl, alkenyl or alkoxy or
  $R^1$ and $R^3$ together with the N atom can form a heterocyclic 5, 6 or 7 membered ring,
  $R^2$ and $R^4$ together with the N atom can form a heterocyclic 5, 6 or 7 membered ring,
  $R^5$ is hydrogen, halogen or optionally substituted alkyl or alkoxy group or is —$NR^{O1}R^{O2}$ where $R^{O1}$ and $R^{O2}$ independently have a meaning of $R^1$ and $R^2$
  $R^6$ and $R^7$ are independently hydrogen, halogen, or an optionally substituted alkyl, alkenyl or alkoxy,
  $R^5$ and $R^6$ together with the N atom can form a heterocyclic 5, 6 or 7 membered ring, or
  $R^5$ and $R^7$ together with the N atom can form a heterocyclic 5, 6 or 7 membered ring and at least one dye of the formula (II),

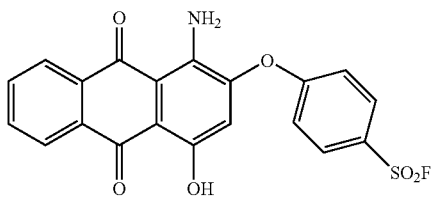

(II)

and optionally one or more dyes of general formula (III),

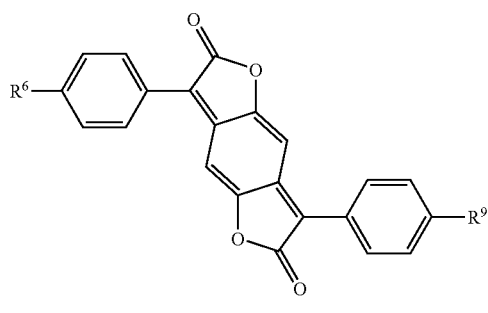

(III)

wherein
R$^8$ and R$^9$ are independently H, C$_1$-C$_4$ alkoxy, C$_1$-C$_4$ alkenyloxy optionally substituted by unsubstituted or substituted saturated or unsaturated 5-, 6-, or 7-membered heterocyclic or homocyclic residues or substituted alkoxy {O(CH$_2$)$_n$R$^{11}$}
wherein
n is an integer from 1 to 6 and
R$^{11}$ is OR$^{12}$ or COR$^{13}$
wherein
R$^{12}$ is H, alkyl, alkenyl, aryl, alkoxyalkyl, aryloxyalkyl, carbonylalkyl, carbonylalkenyl, carbonylaryl, carbonylalkoxyalkyl or carbonylaryloxyalkyl and
R$^{13}$ is alkoxy, alkenyloxy, aryloxy, arylalkoxy, aryloxyalkoxy, alkenyloxyalkoxy or alkoxyalkoxy
or one or more dyes of general formula (IV),

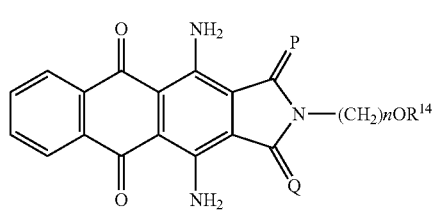

(IV)

wherein at least one of P and Q are independently O or NH and where at least one and P and Q are O,
n is an integer from 1 to 4,
R$^{14}$ is H or C$_1$-C$_4$ alkyl or a C$_1$-C$_4$ alkoxy group, or alternatively, at least one of the herein below indicated and defined general dye of formula (IVa), (IVb) or (IVc),

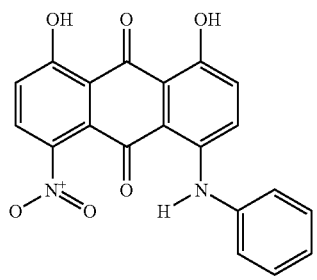

(IVa)

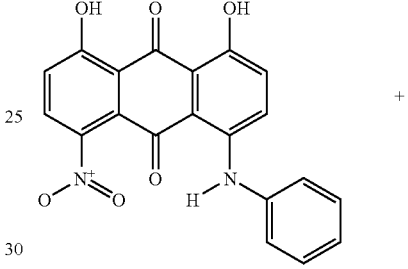

(IVb)

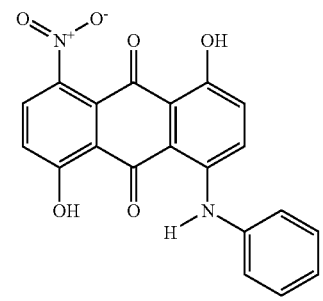

whereas the ratio of these two components (IVa) and (IVb) would be 40-50 to 50-60,

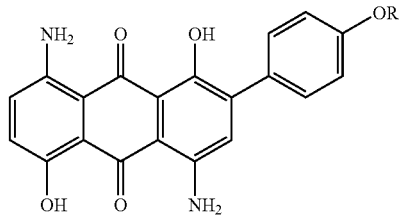

(IVc)

wherein R is H or CH$_3$, the ratio of H to CH$_3$ would 30-70 to 70-30, one or more dyes of general formula (V)

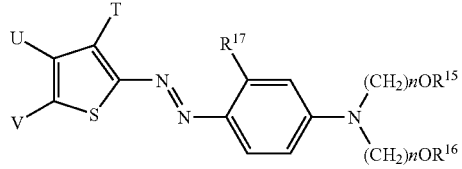
(V)

wherein
T, U and V are independently hydrogen, formyl, acetyl, chloro, bromo, cyano or nitro
n is 1 to 4,
R$^{15}$ and R$^{16}$ are independently C$_1$ to C$_4$ alkyl, alkenyl, aryl, aralkyl, carbonylalkyl, carbonylalkenyl, carbonylaryl, carbonylalkoxyalkyl or carbonylaryloxyalkyl,
R$^{17}$ is hydrogen, halogen, C$_1$ to C$_4$ alkyl or C$_1$ to C$_4$ alkoxy, NHCOR$^{18}$,
where R$^{18}$ is C$_1$ to C$_4$ alkyl or C$_1$ to C$_4$ alkoxy, where in case where R$^{17}$ is NHCOR$^{18}$ then (CH$_2$)$_n$OR$^{15}$/R$^{16}$ are replaced by R$^{19}$ and R$^{20}$ as given in structure (Va)

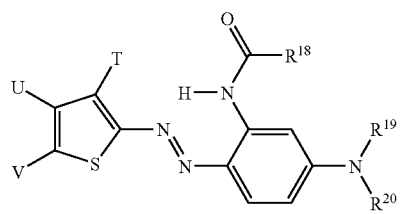
(VA)

wherein
R$^{19}$ and R$^{20}$ are independently hydrogen, alkyl, alkenyl, aryl, aralkyl, alkoxyalkyl, aryloxyalkyl, alkoxycarbonylalkyl and alkylcarbonylalkoxy,
or one or more dyes of general formula (VI)

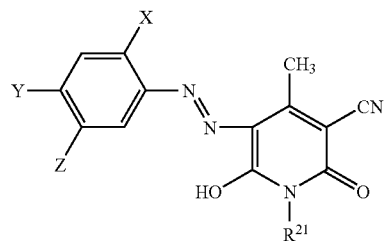
(VI)

wherein
R$^{21}$ is H, alkyl, alkoxyalkyl or aryloxyalkyl,
X is H, halogen, alkyl, nitro or cyano,
Y is independently H, halogen, alkyl, nitro, alkoxyalkoxyakylcarbonyl, arylalkoxycarbonyl, mono or dialkylaminocarbonyl, or alkylalkoxycarbonyl in which the alkali group can be further substituted by a 5, 6 or 7 membered (saturated or unsaturated) heterocyclic ring, or Y is

R$^{22}$SO$_2$ wherein R$^{22}$ is aryloxy, or mono/dialkylamino
Z is independently H, hydroxyl, halogen, or R$^{22}$SO$_2$ wherein R$^{22}$ is aryloxy, or mono/dialkylamino or Z is aryloxyalkoxycarbonyl, or arylalkoxycarbonyl.

2. The dye mixture as claimed in claim 1, wherein
P and Q are O,
n is an integer from 2 or 3,
or alternatively, at least one of the herein below indicated and defined general dye of formula (IVa), (IVb) or (IVc),

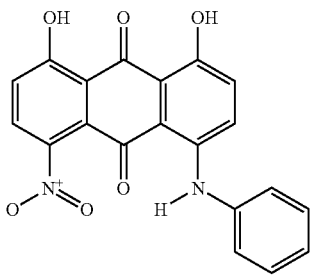
(IVa)

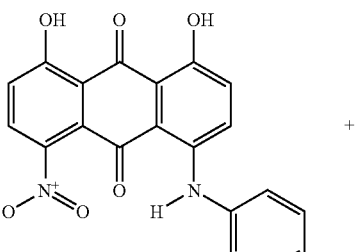
(IVb)

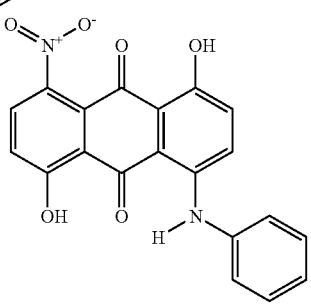

whereas the ratio of these two components (IVa) and (IVb) would be 45 to 55 parts,

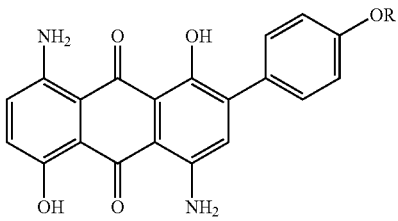
(IVc)

wherein R is H or CH$_3$, the ratio of H to CH$_3$ would be 40-60 to 60-40.

3. The dye mixture according to claim 1 comprising one or more dyes of the general formula 1 and one or more dyestuffs of the general formula (II), and optionally one or more dyestuffs of formula (III), or (IV) or (V) or (VI).

4. The dye mixture according to claim 1 comprising one or more dyes of the general formula (I), a dye of the general formula (II) and one or more dyes of the general formula (VI).

5. The dye mixture according to claim 1 comprising one or more dyes of the general formula (I), a dye of the general formula (II) and one or more dyes of the general formula (IV) and one or more dyes of the general formula (VI).

6. The dye mixture according to claim 1 comprising one or more dyes of the general formula (I), a dye of the general formula (II) and one or more dyes of the general formula (V) and one or more dyes of formula (VI).

7. The dye mixture according to claim 1 comprising one or more dyes of the general formula (I), one or more dyes of the general formula (II), a dye of the general formula (III) and one or more dyes of the general formula (IV) and one or more dyes of formula (VI).

8. The dye mixture according to claim 1 comprising one or more dyes of the general formula (I), one or more dyes of the general formula (II), a dye of the general formula (III) and one or more dyes of the general formula (V) and one or more dyes of formula (VI).

9. The dye mixture according to claim 1 comprising one or more dyes of the general formula (I), a dye of the general formula (II), one or more dyes of the general formula (III), one or more dyes of the general formula (V) and one or more dyes of formula (VI).

10. The dye mixture according to claim 1 comprising one or more dyes of the general formula (I), a dye of the general formula (II), one or more dyes of the general formula (III), one or more dyes of the general formula (IV) and one or more dyes of formula (VI).

11. The dye mixture according to claim 1 comprising one or more dyes of the general formula (I), a dye of the general formula (II), one or more dyes of the general formula (III), one or more dyes of the general formula (IV), one or more dyes of the general formula (V) and one or more dyes of formula (VI).

12. The dye mixture according to claim 1 wherein the mixture comprises 15 to 50% by weight of dyestuff according to the general formula (I), a dyestuff according to the general formula (II) present in an amount not to exceed 50% by weight, 0 to 30% by weight of dyestuff according to the general formula (III), 0 to 40% by weight of dyestuff according to the general formula (IV), 0 to 30% by weight of dyestuff according to the general formula (V) and 0 to 30% by weight according to the general formula (VI).

13. A method for the preparation of the dye mixture according to claim 1 comprising mixing the dye components in the required amounts.

14. A composition comprising a dye mixture according to claim 1 and at least one dispersing agent, surfactant or wetting agent.

15. A process for coloring a synthetic textile material or fibre blend thereof, which comprises applying thereto the dye mixture according to claim 1.

16. The process according to claim 15, wherein the synthetic textile material or fibre blend thereof is a polyester, polyester-cellulose, polyester-nylon, polyester-polyurethane or polyester-wool blend.

17. An aqueous textile inkjet printing ink comprising the dye mixture according to claim 1.

* * * * *

UNITED STATES PATENT AND TRADEMARK OFFICE
CERTIFICATE OF CORRECTION

PATENT NO. : 7,416,591 B2  
APPLICATION NO. : 11/576933  
DATED : August 26, 2008  
INVENTOR(S) : Clemens Grund et al.

It is certified that error appears in the above-identified patent and that said Letters Patent is hereby corrected as shown below:

In the Claims:

In Claim 1, in column 37, on line 20

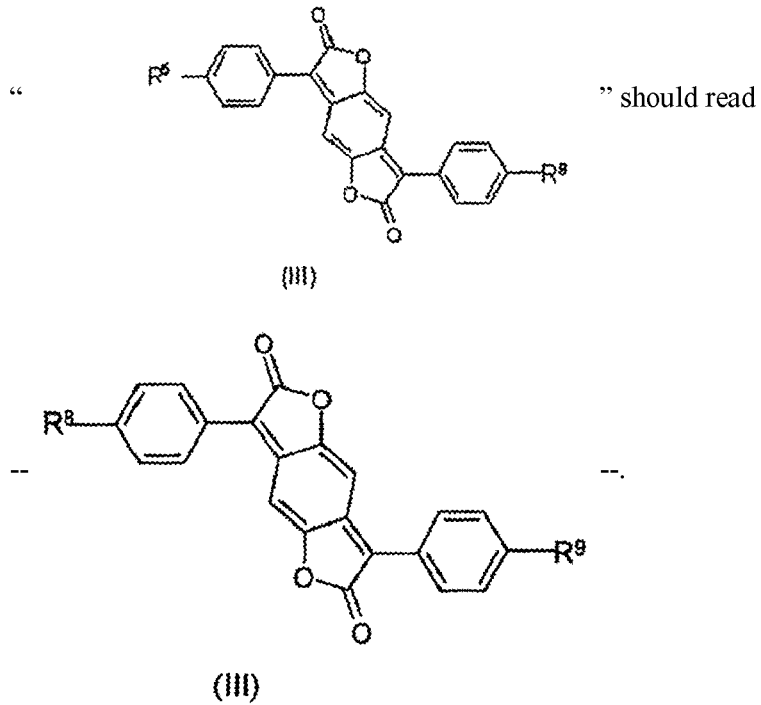

" " should read

-- --.

Signed and Sealed this

Second Day of December, 2008

JON W. DUDAS  
*Director of the United States Patent and Trademark Office*